(12) United States Patent
Do

(10) Patent No.: US 8,023,202 B2
(45) Date of Patent: *Sep. 20, 2011

(54) IMAGING LENS

(75) Inventor: Satoshi Do, Saitama (JP)

(73) Assignee: Milestone Co., Ltd., Chiba (JP)

( * ) Notice: Subject to any disclaimer, the term of this patent is extended or adjusted under 35 U.S.C. 154(b) by 3 days.

This patent is subject to a terminal disclaimer.

(21) Appl. No.: 12/308,573

(22) PCT Filed: Aug. 29, 2007

(86) PCT No.: PCT/JP2007/066785
§ 371 (c)(1),
(2), (4) Date: Dec. 18, 2008

(87) PCT Pub. No.: WO2008/142808
PCT Pub. Date: Nov. 27, 2008

(65) Prior Publication Data
US 2010/0232037 A1    Sep. 16, 2010

(30) Foreign Application Priority Data

May 17, 2007    (JP) .................................. 2007-131925

(51) Int. Cl.
*G02B 3/02*    (2006.01)
(52) U.S. Cl. ........................ 359/713; 359/793
(58) Field of Classification Search .................. 359/793, 359/755, 757, 713
See application file for complete search history.

(56) References Cited

U.S. PATENT DOCUMENTS

| 3,524,699 A | 8/1970 | Mori |
| 5,243,468 A | 9/1993 | Ohtake |

(Continued)

FOREIGN PATENT DOCUMENTS

CN    1863871 A    11/2006

(Continued)

OTHER PUBLICATIONS

Office Action for Application No. 200780026759.5 dated Feb. 12, 2010.

(Continued)

*Primary Examiner* — Joseph Martinez
*Assistant Examiner* — James R Greece
(74) *Attorney, Agent, or Firm* — Venable LLP; Jeffri A. Kaminski; Christopher Ma

(57) ABSTRACT

The present invention is an imaging lens of which optical performance does not deteriorate even in a high temperature environment, various aberrations are well corrected, optical length is short, and back focus is sufficiently secured, the imaging lens comprising a first diaphragm $S_1$, a first junction type compound lens, a second diaphragm $S_2$, and a second junction type compound lens, characterized in that the first diaphragm, the first junction type compound lens, the second diaphragm and the second junction type compound lens are arranged in this sequence from an object side to an image side. The first junction type compound lens comprises a first lens $L_1$, a second lens $L_2$ and a third lens $L_3$, arranged in the sequence from the object side to the image side, and the second junction type compound lens comprises a fourth lens $L_4$, a fifth lens $L_5$ and a sixth lens $L_6$, arranged in this sequence from the object side to the image side. The first lens, the third lens, the fourth lens and the sixth lens are formed of a curable resin material. The second lens and the fifth lens are formed of a high softening temperature optical glass material.

17 Claims, 18 Drawing Sheets

U.S. PATENT DOCUMENTS

| | | | |
|---|---|---|---|
| 5,959,788 | A | 9/1999 | Yamakawa et al. |
| 6,551,530 | B2 * | 4/2003 | Koizumi et al. |
| 6,560,037 | B2 * | 5/2003 | Dou |
| 6,816,322 | B2 * | 11/2004 | Abe et al. ............ 359/796 |
| 6,862,804 | B2 * | 3/2005 | Nishio et al. |
| 2002/0041450 | A1 * | 4/2002 | Katsuma |
| 2002/0041451 | A1 | 4/2002 | Harada |
| 2006/0050399 | A1 * | 3/2006 | Nakagawa |

FOREIGN PATENT DOCUMENTS

| | | | |
|---|---|---|---|
| EP | 0 989 417 | | 3/2000 |
| JP | 2001-242308 | * | 9/2001 |
| JP | 2001-305309 | * | 10/2001 |
| JP | 2002-55274 | * | 2/2002 |
| JP | 2002055274 | | 2/2002 |
| JP | 2002-154169 | * | 5/2002 |
| JP | 2002-154170 | | 5/2002 |
| JP | 2002041451 | | 11/2002 |
| JP | 2003-311757 | | 11/2003 |
| JP | 2004-053834 | | 2/2004 |
| JP | 2004-328474 | | 11/2004 |
| JP | 2005010197 | A | 1/2005 |
| JP | 2005-067999 | | 3/2005 |
| JP | 2005-084273 | | 3/2005 |
| JP | 2005-258329 | | 9/2005 |
| JP | 2005-305938 | | 11/2005 |
| JP | 2005352266 | | 12/2005 |
| JP | 2006-121079 | | 5/2006 |
| JP | 2006-195053 | | 7/2006 |
| JP | 2006-308669 | | 11/2006 |
| JP | 2006-323365 | * | 11/2006 |
| JP | 3929479 | * | 6/2007 |

OTHER PUBLICATIONS

European Search Report dated Aug. 20, 2009.

Japanese International Search Report (PCT/ISA/210), issued Jul. 17, 2007 for PCT/JP2007/058042.

Office Action issued Dec. 10, 2009 in related U.S. Appl. No. 11/921,174.

European Search Report issued Jul. 22, 2009 in application EP 07 74 1478.

* cited by examiner

IMAGING LENS

TECHNICAL FIELD

The present invention relates to an imaging lens, and more particularly to an imaging lens that can be suitably mounted on a portable telephone or the like.

BACKGROUND ART

In a portable telephone with a built-in digital camera, an imaging lens is mounted on a printed circuit board. As a method for mounting an imaging lens on a printed circuit board, a reflow soldering processing is used. Hereafter the reflow soldering processing may simply be called "reflow processing". Reflow processing is a method for soldering an electronic component on a printed circuit board, by placing a solder ball in advance at a location where an electronic component is connected, placing the electronic component there, heating to melt the solder ball, then cooling the solder ball down.

Generally in mass production steps, a reflow step for performing reflow processing is used as a method for mounting electronic elements or such components as an imaging lens on a printed circuit board. If the reflow step is used, the mounting cost of components on a printed circuit board can be decreased, and manufacturing quality can be maintained at a predetermined level.

In the reflow step of the manufacturing steps of a portable telephone comprising an imaging lens, not only are electronic components arranged at predetermined positions on a printed circuit board, but also the imaging lens itself or a socket for installing the imaging lens is disposed on the printed circuit board.

The imaging lenses installed in portable telephones are largely made of plastic in order to decrease the manufacturing cost, and to ensure lens performance. Therefore a heat resistant socket component is used for installing an imaging lens in order to prevent thermal deformation of the imaging lens in a high temperature environment, which makes it impossible to maintain optical performance thereof.

In other words, in the reflow step, a heat resistant socket component for installing an imaging lens is mounted on the printed circuit board of the portable telephone, so that the imaging lens is not exposed to high temperature in the reflow step (e.g. see Patent Documents 1 to 3). However, using a heat resistant socket component for installing an imaging lens makes the manufacturing steps complicated, and increases the manufacturing cost, including the cost of this heat resistant socket.

A recent demand is that the optical performance of an imaging lens installed in a portable telephone does not deteriorate even if the portable telephone itself is placed in about a 150° C. high temperature environment, considering the case of the portable telephone being left in an automobile which temporarily becomes a high temperature environment. A conventional imaging lens made of plastic material cannot meet this demand.

In order to implement an imaging lens of which optical performance is maintained even in a high temperature environment, forming an imaging lens using a high softening temperature mold glass material is possible (e.g. see Patent Document 4). Since the temperature at which the high softening temperature mold glass material softens is several hundred degrees or more, the deterioration of optical performance of an imaging lens in a high temperature environment can be avoided, but at the moment, an imaging lens made of mold glass material is not very popular, because the manufacturing cost is very high.

In addition to the above mentioned thermal characteristics, an imaging lens installed in a portable telephone or the like must satisfy the following conditions related to optical characteristics. One condition is that the optical length is short. The optical length refers to a distance from an entrance plane at an object side to an image formation plane (also called "imaging plane") of the imaging lens. In other words, when a lens is designed, the ratio of the optical length to the composite focal distance of the imaging lens must be minimized. In the case of a portable telephone, for example, this optical length must at least be shorter than the thickness of the portable telephone unit.

On the other hand, a back focus, which is defined as a distance from the outgoing plane at the image side to the imaging plane of the imaging lens, should be as long as possible. In other words, when the lens is designed, the ratio of the back focus to the focal distance must be maximized. This is because such components as a filter and a cover glass must be inserted between the imaging lens and the imaging plane.

In addition to this, it is naturally demanded for the imaging lens that various aberrations are corrected to be small enough that the distortion of the image is not visually recognized, and that the integration density of the image sensing elements in minimal units (also called "pixels"), which are arranged in a matrix on the light receiving plane of a CCD (Charge Coupled Device) image sensor or the like, is sufficiently satisfied. In other words, various aberrations of the imaging lens must be well corrected. Hereafter an image, of which various aberrations are well corrected, may be called a "good image".

Patent Document 1: Japanese Patent Application Laid-Open No. 2006-121079 (U.S. Pat. No. 3,799,615)

Patent Document 2: Japanese Patent Application Laid-Open No. 2004-328474 (U.S. Pat. No. 3,915,733)

Patent Document 3: Japanese Patent Application Laid-Open No. 2004-063787 (U.S. Pat. No. 3,755,149)

Patent Document 4: Japanese Patent Application Laid-Open No. 2005-067999

DISCLOSURE OF THE INVENTION

Problems to be Solved by the Invention

With the foregoing in view, it is an object of the present invention to provide an imaging lens suitable for being installed in a portable telephone or the like, and of which heat resistance is guaranteed and optical performance does not deteriorate even in a high temperature environment of a reflow step, or even if the imaging lens is installed in a portable telephone or the like and is temporarily placed in the maximum temperature environment in the design specifications.

It is another object of the present invention to provide an imaging lens of which optical length is short enough to be installed in a portable telephone or the like, back focus is long enough to insert such a component as a filter and a cover glass between the imaging lens and the imaging plane, and with which a good image is acquired.

Means for Solving the Problems

To achieve the above objects, an imaging lens of this invention comprises a first diaphragm, a first junction type compound lens, a second diaphragm and a second junction type compound lens, characterized in that the first diaphragm, the first junction type compound lens, the second diaphragm and the second junction type compound lens are arranged in this sequence from an object side to an image side.

The first junction type compound lens comprises a first lens, a second lens and a third lens arranged in this sequence from the object side to the image side, and the first lens and the third lens are formed of curable resin material. The second junction type compound lens comprises a fourth lens, a fifth lens and a sixth lens arranged in this sequence from the object side to the image side, and the fourth lens and the sixth lens are formed of a curable resin material. The second lens and the fifth lens are formed of a high softening temperature optical glass material. The first lens and the second lens are indirectly bonded, and the second lens and the third lens are indirectly bonded. The fourth lens and the fifth lens are indirectly bonded, and the fifth lens and the sixth lens are indirectly bonded.

Or the first junction type compound lens comprises a first lens, a second lens and a third lens arranged in this sequence from the object side to the image side, and the first lens, the second lens and the third lens are formed of a curable resin material. The second type compound lens comprises a fourth lens, a fifth lens and a sixth lens arranged in this sequence from the object side to the image side, and the fourth lens, the fifth lens and the sixth lens are formed of a curable resin material. The first lens and the second lens are directly bonded or indirectly bonded, and the second lens and the third lens are directly bonded or indirectly bonded. The fourth lens and the fifth lens are directly bonded or indirectly bonded, and the fifth lens and the sixth lens are directly bonded or indirectly bonded.

The curable resin material refers to both a thermosetting resin material and a UV-curable resin material. The high softening temperature optical glass material refers to such optical glass material as a high softening temperature mold glass material or boro-silicate glass.

The bonding of the second lens formed of a curable resin material and the first lens or the third lens formed of a curable resin material, and the bonding of the fifth lens formed of a curable resin material and the fourth lens or the sixth lens formed of a curable resin material, are implemented as follows. A liquid type curable resin material is contacted to the second lens formed of the curable resin material, and the first lens or the third lens is bonded to the second lens by solidifying, that is, by curing this curable resin material. Or a liquid type curable resin material is contacted to the fifth lens formed of the curable resin material, and the fourth lens or the sixth lens is bonded to the fifth lens by solidifying, that is, by curing, this curable resin material. This bonding may be called "direct bonding" herein below. The second lens and the first lens or the third lens may be bonded by using an adhesive between the second lens and the first lens or the third lens. The fifth lens and the fourth lens or the sixth lens may be bonded by using an adhesive between the fifth lens and the fourth lens or the sixth lens. This bonding may be called "indirect bonding" herein below.

The bonding of the second lens formed of a high softening temperature optical glass and the first lens or the third lens formed of a curable resin material, and the bonding of the fifth lens formed of a high softening temperature optical glass and the fourth lens or the sixth lens formed of a curable resin material, are performed by indirect bonding.

When the junction type compound lens is implemented by indirect bonding, whether it is the case of the second lens formed of a curable resin material or the case of the second lens formed of a high softening temperature optical glass, the reflection in the interface between the second lens and the first lens or the third lens can be decreased if the adhesive is selected so that the optical characteristics of the adhesive can be utilized, such as selecting an appropriate refractive index of the adhesive with respect to the refractive index of the second lens and the refractive index of the first or third lens. In the same way, when the junction type compound lens is implemented by indirect bonding, whether it is the case of the fifth lens formed of a curable resin material or the case of the fifth lens formed of a high softening temperature optical glass, the reflection in the interface between the fifth lens and the fourth lens or the sixth lens can be decreased if the adhesive is selected so that the optical characteristics of the adhesive can be utilized, such as selecting an appropriate refractive index of the adhesive with respect to the refractive index of the fifth lens and the refractive index of the fourth or sixth lens.

If coating processing is performed on the surface of the second lens facing the first lens or the third lens and these lenses are bonded, whether adhesive is used to bond or not, the reflection in the interface with the first lens (or the third lens) can be decreased. In the same way, if coating processing is performed on the fifth lens facing the fourth lens or the sixth lens and these lenses are bonded, whether the adhesive is used to bond or not, the reflection in the interface with the fourth lens (or the sixth lens) can be decreased.

In the above mentioned imaging lens, it is preferable to set settings so as to satisfy the following Conditions (1) to (8).

$$0 \leq |N_3 - N_2| \leq 0.1 \quad (1)$$

$$0 \leq |N_3 - N_4| \leq 0.1 \quad (2)$$

$$0 \leq |v_3 - v_2| \leq 30.0 \quad (3)$$

$$0 \leq |v_3 - v_4| \leq 30.0 \quad (4)$$

$$0 \leq |N_9 - N_8| \leq 0.1 \quad (5)$$

$$0 \leq |N_9 - N_{10}| \leq 0.1 \quad (6)$$

$$0 \leq |v_9 - v_8| \leq 30.0 \quad (7)$$

$$0 \leq |v_9 - v_{10}| \leq 30.0 \quad (8)$$

where
$N_2$: refractive index of the first lens
$N_3$: refractive index of the second lens
$N_4$: refractive index of the third lens
$v_2$: Abbe number of the first lens
$v_3$: Abbe number of the second lens
$v_4$: Abbe number of the third lens
$N_8$: refractive index of the fourth lens
$N_9$: refractive index of the fifth lens
$N_{10}$: refractive index of the sixth lens
$v_8$: Abbe number of the fourth lens
$v_9$: Abbe number of the fifth lens
$v_{10}$: Abbe number of the sixth lens The second lens and the fifth lens can be optical-parallel plates. An optical-parallel plate normally is not referred to as a lens, but in the description of the present invention, an optical-parallel plate may be included in a lens description for the convenience of explanation, regarding this as a special case where the radius of curvature of the lens surface is infinite.

If the second lens and the fifth lens are optical-parallel plates, the first lens can be a plano-convex lens where the object side face of the first lens is a convex surface facing the object side on a paraxial line, the third lens can be a plano-concave lens where the image side face of the third lens is a concave surface facing the image side on a paraxial line, the fourth lens is a plano-convex lens where the object side face of the fourth lens is a convex surface facing the object side on a paraxial line, and the sixth lens can be a plano-concave lens where the image side face of the sixth lens is a concave surface facing the image side on a paraxial line.

It is also possible that the second lens is a biconvex lens, the first lens can be a lens where the object side face of the first lens is a convex surface facing the object side on a paraxial line, the third lens is a lens where the image side face of the third lens is a concave surface facing the image side on a paraxial line, the fifth lens is a biconcave lens, the fourth lens is a lens where the object side face of the fourth lens is a convex surface facing the object side on a paraxial line, and the sixth lens is a lens where the image side face of the sixth lens is a concave surface facing the image side on a paraxial line.

It is also possible that the second lens is a meniscus lens of which convex surface faces the object side, the first lens is a lens where the object side face of the first lens is a convex surface facing the object side on a paraxial line, the third lens is a lens where the image side face of the third lens is a concave surface facing the image side on a paraxial line, the fifth lens is a meniscus lens of which convex surface faces the object side, the fourth lens is a lens where the object side face of the fourth lens is a convex surface facing the object side on a paraxial line, and the sixth lens is a lens where the image side face of the sixth lens is a concave surface facing the image side on a paraxial line.

It is also possible that the second lens is a biconcave lens, the first lens is a lens where the object side face of the first lens is a convex surface facing the object side on a paraxial line, the third lens is a lens where the image side face of the third lens is a concave surface facing the image side on a paraxial line, the fifth lens is a biconvex lens, the fourth lens is a lens where the object side face of the fourth lens is a convex surface facing the object side on a paraxial line, and the sixth lens is a lens where the image side face of the sixth lens is a concave surface facing the image side on a paraxial line.

To form the imaging lens of the present invention, it is preferable that the object side face of the first lens and the image side face of the third lens are aspheric, and the object side face of the fourth lens and the image side face of the sixth lens are aspheric.

It is also preferable that at least one surface out of both surfaces of the second lens and both surfaces of the fifth lens, a total of four surfaces, is coating-processed, the first lens and the second lens are indirectly bonded, the second lens and the third lens are indirectly bonded, the fourth lens and the fifth lens are indirectly bonded, and the fifth lens and the sixth lens are indirectly bonded.

To form the imaging lens of the present invention, it is preferable that the curable resin material, which is a material of the first lens, third lens, fourth lens and sixth lens, is a transparent curable silicone resin. In the case of implementing all the lenses of the first lens to the sixth lens formed of curable resin material, it is preferable that this curable resin material is also a transparent curable silicone resin. "Transparent" here indicates that the light absorption of visible light is small (transparent) enough to have no influence on practical use.

EFFECT OF THE INVENTION

According to the imaging lens of the present invention, in the first junction type compound lens constituting this imaging lens, the first and the third lenses, which are formed of curable resin material, sandwich and are indirectly bonded to the second lens, which is formed of a high softening temperature optical glass material. In the second junction type compound lens, the fourth and the sixth lenses, which are formed of curable resin material, sandwich and are indirectly bonded to the fifth lens, which is formed of a high softening temperature optical glass material. The high softening temperature optical glass material here refers to an optical glass material of which softening temperature is higher than both the temperature in the reflow processing and the maximum environmental temperature in the design specifications of the junction type compound lens. In the following description, the phrase "high softening temperature optical glass material" is used when a thermal characteristic of the optical glass material is discussed, and the simple phrase "optical glass" may be used when an optical characteristic is discussed.

In the imaging lens of this invention, it is also possible that the first junction type compound lens comprises a first lens, a second lens and a third lens arranged in this sequence from the object side to the image side, and the first lens, the second lens and the third lens are formed of a curable resin material. It is also possible that the second junction type compound lens comprises a fourth lens, a fifth lens and a sixth lens arranged in this sequence from the object side to the image side, and the fourth lens, the fifth lens and the sixth lens are formed of a curable resin material. In this case, the first lens and the second lens are directly bonded or indirectly bonded, and the second lens and the third lens are directly bonded or indirectly bonded. The fourth lens and the fifth lens are directly bonded or indirectly bonded, and the fifth lens and the sixth lens are directly bonded or indirectly bonded.

The curable resin material does not soften once curing processing is performed, even if the temperature rises more than a predetermined temperature. This nature of the curable resin material is different from the nature of a plastic resin material, such as plastic material, which becomes soft and plasticized if the material is exposed to a temperature that exceeds a predetermined temperature, which is referred to as a "softening temperature" (also referred to as a "glass transition temperature"). In other words, once curing processing is performed and solidified, the geometric shape of the curable resin material does not change.

Therefore the geometric shapes of the first lens, third lens, fourth lens and sixth lens do not change, and optical performances thereof do not deteriorate even if a lens is placed in a high temperature environment. The second lens and the fifth lens are also formed of a high softening temperature optical glass material, so the optical performance thereof does not deteriorate even under a high temperature environment. In the case of the second lens and fifth lens formed of curable resin material as well, the optical performance thereof does not deteriorate even under a high temperature environment. High temperature environment here refers to a temperature environment higher than both the temperature in reflow processing and the maximum temperature in the design specifications of the junction type compound lens.

Therefore the optical performance of the first junction type compound lens and the second junction type compound lens is guaranteed even in a high temperature environment, where the temperature is at the maximum, which is assumed in reflow processing and when the imaging lens is in use.

If the second lens and fifth lens are formed using curable resin material, the following effect can be implemented. Compared with the case of forming these lenses using a high softening temperature optical glass material, the manufacturing accuracy of the thickness of the second lens and fifth lens is high. In other words, the manufacturing accuracy of the thickness of the second lens and fifth lens in the case of using a high softening temperature optical glass material is about ±10 μm, while the manufacturing accuracy of the thickness thereof in the case of using curable resin material can be improved up to about ±3 μm. In this way, since the manufacturing accuracy of the thickness of the second lens and fifth lens can be increased, the imaging lens can be manufactured without deviating very much from various characteristics, such as aberration, that are assumed in design specifications.

In order to implement the above mentioned indirect bonding, an adhesive is used between the bonding surfaces. When the junction type compound lens is manufactured by indirect bonding, the first lens to the third lens are formed first, then an adhesive is coated on a surface of the second lens facing the first lens or the third lens, or on the surface of the first lens or the third lens facing the second lens, and both lenses are contacted. In the same way, the fourth lens to the sixth lens are formed first, then an adhesive is coated on a surface of the fifth lens facing the fourth lens or sixth lens, or on the surface of the fourth lens or sixth lens facing the fifth lens, and both lenses are contacted.

Coating processing may be performed on a surface of the second lens facing the first lens or the third lens, and both lenses are indirectly bonded. And coating processing may be performed on a surface of the fifth lens facing the fourth lens or sixth lens, and both lenses are indirectly bonded.

When indirect bonding is implemented, reflection in the interface between the second lens and the first lens or the third lens can be decreased if the adhesive is selected so that the optical characteristics of the adhesive can be utilized, such as selecting an appropriate refractive index of the adhesive with respect to the refractive index of the optical glass and the refractive index of the curable resin material. If the coating processing is performed on the surface of the second lens facing the first lens or the third lens, and these lenses are bonded, as mentioned above, the reflection in the interface with the first lens (or the third lens) can be decreased. In the same manner, reflection in the interface between the fifth lens and the fourth lens or the sixth lens can be decreased. Furthermore, if the coating processing is performed on the surface of the fifth lens facing the fourth lens or the sixth lens, and these lenses are bonded, as mentioned above, the reflection in the interface with the fourth lens (or the sixth lens) can be decreased.

Now the optical characteristics of the imaging lens of the present invention will be described.

The optical structural principle of the imaging lens of the present invention implements two roles, which are aberration correction and image format, by a single junction type compound lens, of which optical characteristics, such as the reflective index, are as uniform as possible. In other words, it is preferable that the respective refractive index and the Abbe number of the first to third lenses, constituting the first junction type compound lens of the imaging lens of the present invention, do not differ very much from each other. Also it is preferable that the respective refractive index and the Abbe number of the fourth to sixth lenses, constituting the second junction type compound lens, do not differ very much from each other. This means that it is ideal that the respective refractive index and the Abbe number of the first to third lenses are the same as each other. Also it is ideal that the respective refractive index and the Abbe number of the fourth to sixth lenses are the same as each other. In practical terms, however, it is extremely difficult to find a combination of an optical glass material and a curable resin material with which refractive indexes and Abbe numbers are precisely the same.

Therefore the inventor of the present invention checked, through various simulations and prototyping, the approximate upper limit of the differences of the refractive indexes and Abbe numbers between the optical glass material and the curable resin material constituting the first and second junction type compound lenses respectively, which could generate good images. As a result, it was confirmed that an imaging lens which can generate good images can be constructed by satisfying the above Conditions (1) to (8).

In other words, if the difference between the refractive index $N_2$ of the first lens and the refractive index $N_3$ of second lens, the difference between the refractive index $N_3$ of the second lens and the refractive index $N_4$ of the third lens, the difference between the refractive index $N_8$ of the fourth lens and the refractive index $N_9$ of the fifth lens, and the difference between the refractive index $N_9$ of the fifth lens and the refractive index $N_{10}$ of the sixth lens are within 0.1 respectively, then the distortion aberration, astigmatism aberration and chromatic/spherical aberration become small enough to generate good images.

Also if the difference between the Abbe number $v_2$ of the first lens and the Abbe number $v_3$ of the second lens, the difference between the Abbe number $v_3$ of the second lens and the Abbe number $v_4$ of the third lens, the difference between the Abbe number $v_8$ of the fourth lens and the Abbe number $v_9$ of the fifth lens, and the difference between the Abbe number $v_9$ of the fifth lens and the Abbe number $v_{10}$ of the sixth lens are within 30.0 respectively, then the value of the chromatic aberration can be small enough to generate good images, and the images can have sufficient contrast.

Moreover, as the following examples show, if the above Conditions (1) to (8) are satisfied, an imaging lens of which optical length is short enough to be installed in a portable telephone or the like, of which back focus is long enough to insert such components as a filter and cover glass between the imaging lens and the imaging plane, and with which good images can be acquired, can be implemented.

Figure 1:
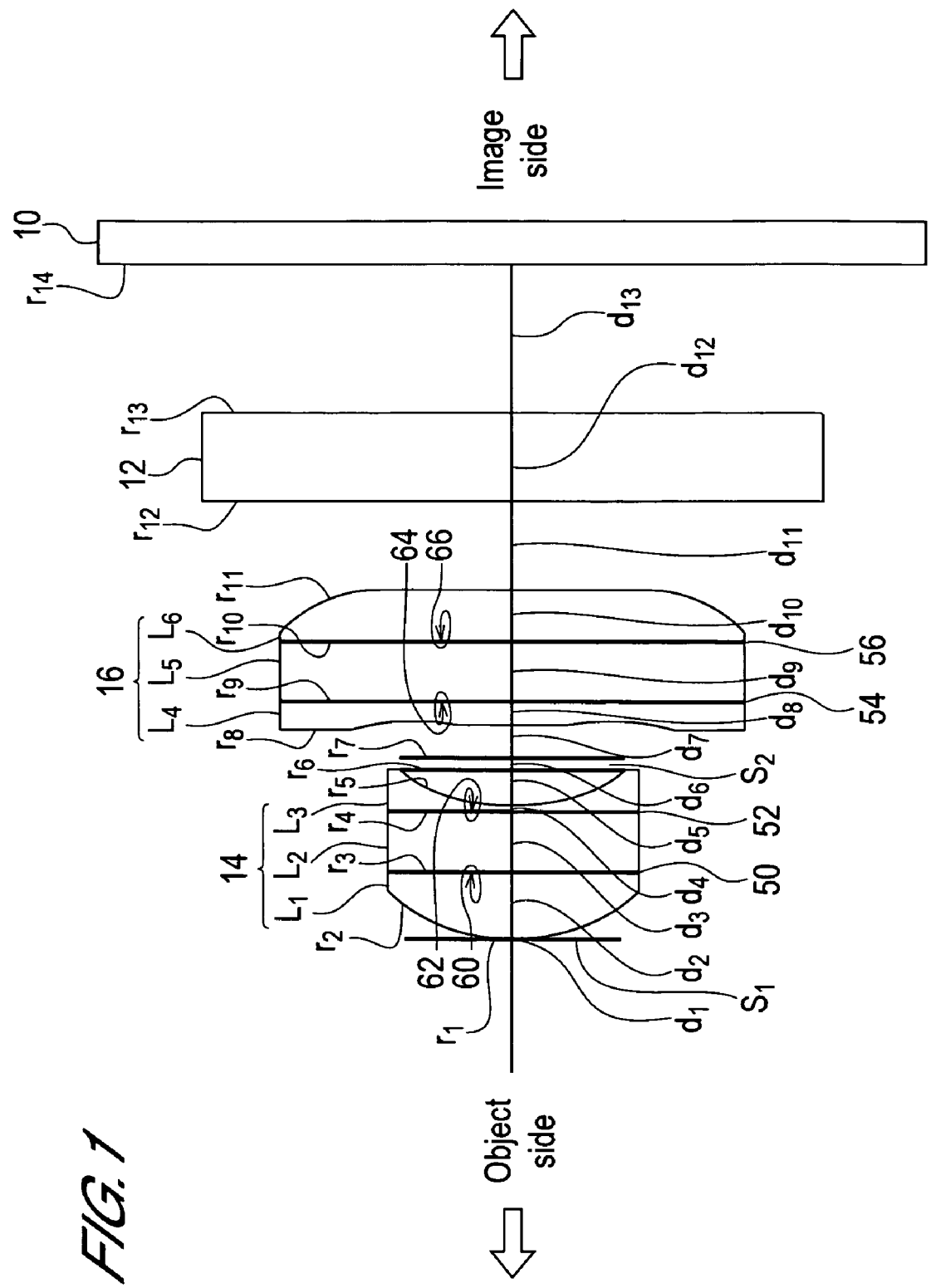
FIG. 1 is a cross-sectional view depicting an imaging lens according to the present invention.

EXPLANATION OF REFERENCE SYMBOLS 10 image sensing element
12 cover glass
14 first junction type compound lens
16 second junction type compound lens
50, 52, 54, 56 adhesive
60, 62, 64, 66 coating film
$S_1$ first diaphragm
$S_2$ second diaphragm
$L_1$ first lens
$L_2$ second lens
$L_3$ third lens
$L_4$ fourth lens
$L_5$ fifth lens
$L_6$ sixth lens

BEST MODE FOR CARRYING OUT THE INVENTION

Embodiments of the present invention will now be described with reference to the drawings. Each drawing, however, simply illustrates one configuration example of the present invention, and roughly shows a cross-section of each composing element and positional relationship in order to assist in understanding the present invention, and do not limit the present invention to the illustrated example. In the following description, specific materials and conditions may be used, but these materials and conditions are merely examples of preferred embodiments, and therefore the present invention is not limited in any way by these materials and conditions.

FIG. 1 is a diagram depicting a configuration of an imaging lens of an embodiment of the present invention. The symbols of the surface number ($r_i$ (i=1, 2, 3, ..., 14)) and the surface spacing ($d_i$ (i=1, 2, 3, ..., 13)) defined in FIG. 1 are omitted in FIG. 2, FIG. 6, FIG. 10, FIG. 14, FIG. 18 and FIG. 22, so that the drawing does not become complicated.

As FIG. 1 shows, a first, second and third lenses constituting a first junction type compound lens 14 are denoted with $L_1$, $L_2$ and $L_3$ respectively. And a fourth, fifth and sixth lenses constituting a second junction type compound lens 16 are denoted with $L_4$, $L_5$ and $L_6$ respectively.

A first diaphragm $S_1$ disposed on a front face (front face $r_2$ of the first lens) of the first junction type compound lens 14 plays a role of an aperture diaphragm and defines a position of an entrance pupil. And a second diaphragm $S_2$ disposed between the first junction type compound lens 14 and the second junction type compound lens 16 plays a role of preventing a flare, which is a phenomena of a lowered image contrast, or a smear, which is a phenomena of an image smearing.

Within a range where no misunderstanding occurs, $r_i$ (i=1, 2, 3, ..., 14) may be used as a variable that indicates a value of a radius of curvature on an optical axis, or as a symbol that identifies a lens, cover glass surface or imaging plane (e.g. $r_2$ is used to indicate the object side face of the first lens $L_1$ constituting the first junction type compound lens 14).

In FIG. 1, adhesives 50, 52, 54 and 56, for indirect bonding, exist on the interfaces indicated by $r_3$, $r_4$, $r_9$ and $r_{10}$ respectively. If coating processing has been performed on both sides or on one side of the second lens $L_2$, the coating film 60 or coating film 62 exists. If coating processing has been performed on both sides or on one side of the fifth lens $L_5$, the coating film 64 or coating film 66 exists.

In order to indicate the presence of the adhesives 50, 52, 54 and 56, and the coating films 60, 62, 64 and 66, the interfaces indicated by $r_3$, $r_4$, $r_9$ and $r_{10}$ are shown by bold lines. In FIG. 2, FIG. 6, FIG. 10, FIG. 14, FIG. 18 and FIG. 22 as well, an adhesive or coating film exists on the interfaces indicated by $r_3$, $r_4$, $r_9$ and $r_{10}$, in the case of indirect bonding, but are shown as thin lines, just like $r_2$, $r_5$, $r_8$ and $r_{11}$, and indications for the adhesives 50, 52, 54 and 56 and coating films 60, 62, 64 and 66 are omitted, so that the drawings do not become complicated. In the imaging lens of the present invention, the thickness of the adhesive is small enough not to affect the optical characteristics of the imaging lens, so the thickness of the adhesive is ignored even if the adhesive exists on the interfaces indicated by $r_3$, $r_4$, $r_9$ and $r_{10}$. Needless to say, the bonding surfaces of the first and third lenses $L_1$ and $L_3$, to be directly or indirectly bonded to the second lens $L_2$, have a shape matching the bonding surface of the second lens $L_2$, and the bonding surfaces of the fourth and sixth lenses $L_4$ and $L_6$, to be directly or indirectly bonded to the fifth lens $L_5$, have a shape matching the bonding surface of the fifth lens $L_5$.

Table 1 to Table 6 show the specific values of the parameters, such as $r_i$ (i=1, 2, 3, ..., 14) and $d_i$ (i=1, 2, 3, ..., 13) shown in these drawings. The suffix i is added corresponding to the diaphragms (first and second diaphragms), and surface number of each lens, thickness of the lens, or the surface spacing of the lens sequentially from the object side to the image side. In other words, $r_i$ is a radius of curvature on the optical axis on the i-th surface, $d_i$ is a distance from the i-th surface to the (i+1)th surface, $N_i$ is a refractive index of the material of the lens having the i-th surface and (i+1)th surface, and $v_i$ is an Abbe number of the material of the lens having the i-th surface and (i+1)th surface.

In FIG. 1, the aperture of the diaphragm (first and second diaphragms) is shown by a segment. This is because the intersection of the diaphragm surface and the optical axis must be clearly shown to define the distance from the lens surface to the diaphragm surface. In FIG. 2, FIG. 6, FIG. 10, FIG. 14, FIG. 18 and FIG. 22, which are cross-sectional views of the imaging lens of Embodiment 1 to Embodiment 6 respectively, a main body of the diaphragm for shielding light is shown by the half lines of which start point is the edge of the aperture, by opening the aperture of the diaphragm, which is opposite to FIG. 1. This is because the status of the diaphragm must be shown by opening the aperture of the diaphragm in order to enter such a beam as a principal ray. For the second diaphragm for which the thickness thereof cannot be ignored due to the structure of the imaging lens, the thickness is indicated as $d_6$.

The optical length L is a distance from the first diaphragm $S_1$ to the imaging plane. The back focus bf is a distance from the image side surface of the sixth lens $L_6$ constituting the second junction type compound lens 16, to the imaging plane. Here the length from the image side face of the sixth lens $L_6$ to the imaging plane, which is measured without a cover glass, is regarded as the back focus bf.

The aspherical data is shown in Table 1 to Table 6 respectively with surface numbers. The value $r_i$ (i=1, 2, 3, . . . , 14) of the radius of curvature on the optical axis is a positive value if it is convex to the object side, and is a negative value if it is convex to the image side.

Both surfaces ($r_3$ and $r_4$) when the second lens is an optical-parallel plate, both surface ($r_9$ and $r_{10}$) when the fifth lens is an optical-parallel plate, the first diaphragm S ($r_1$), second diaphragm ($r_6$, $r_7$) and the surfaces of the cover glass (or filter) ($r_{12}$ and $r_{13}$) are planes, so the radius of the curvature is indicated as ∞. The imaging plane ($r_{14}$) is a plane so $r_{14}=\infty$, but this is omitted in Table 1 to Table 6.

The aspherical surface used for this invention is given by the following expression:

$$Z=ch^2/[1+[1-(1+k)c^2h^2]^{+1/2}]+A_4h^4+A_6h^6+A_8h^8+A_{10}h^{10}$$

where
Z: depth from the vertex of the surface to the contact surface
c: curvature of the surface on the optical axis
h: height from the optical axis
k: cone constant
$A_4$: aspherical surface coefficient of degree 4
$A_6$: aspherical surface coefficient of degree 6
$A_8$: aspherical surface coefficient of degree 8
$A_{10}$: aspherical surface coefficient of degree 10

In Table 1 to Table 6 in this description, the numeric value to indicate an aspherical surface coefficient is denoted by an exponent, "e−1" for example, which means "the −1th power of 10". The value indicated as the focal distance f is a composite focal distance of the first junction type compound lens and the second junction type compound lens. For each embodiment, the open F number (also called the "open F value"), which is an index of the brightness of the lens, is indicated by Fno. The open F number refers to the F number when the diameter of the aperture diaphragm (first diaphragm) is the maximum in design specifications. The diagonal length 2Y of the square image surface is indicated as the image height. Y is a value half the diagonal length of the square image surface.

Now the imaging lens according to Embodiment 1 to Embodiment 6 of the present invention will be described with reference to FIG. 2 to FIG. 25.

The distortion aberration curves shown in FIG. 3, FIG. 7, FIG. 11, FIG. 15, FIG. 19 and FIG. 23 show the aberration (unsatisfactory quantity of the tangent condition is shown in the abscissa by percentage) with respect to the distance from the optical axis (shown in the ordinate by percentage with the maximum distance from the optical axis within the image surface as 100). The astigmatism aberration curves shown in FIG. 4, FIG. 8, FIG. 12, FIG. 16, FIG. 20 and FIG. 24 show the aberration quantity (mm units) in the abscissa with respect to the distance from the optical axis (%) shown in the ordinate, just like the distortion aberration curves, and show the aberration quantity (mm units) on the meridional surface and the sagittal surface respectively.

The chromatic/spherical aberration curve in FIG. 5, FIG. 9, FIG. 13, FIG. 17, FIG. 21 and FIG. 25 show the aberration (mm units) in the abscissa with respect to the entrance height h in the ordinate. The entrance height h in the ordinate is shown as a value converted into an F number. For example, in the case of a lens of which Fno is 2.9, the entrance height h=100% of the ordinate corresponds to F=2.9.

For the chromatic/spherical aberration curves, the aberration values with respect to the C-line (light of which wavelength is 656.3 nm), d-line (light of which wavelength is 587.6 nm), e-line (light of which wavelength is 546.1 nm), F-line (light of which wavelength is 486.1 nm) and g-line (light of which wavelength is 435.8 nm) are shown.

Table 1 to Table 6 show the list of the radius of curvature (mm units), lens surface spacing (mm units), refractive index of lens material, Abbe number of lens material, focal distance, F number and aspherical surface coefficient of composing lenses of Embodiment 1 to Embodiment 6 respectively. The radius of curvature on the optical axis and the lens surface spacing of the composing lens are shown as values when the value of the composite focal distance f of the imaging lens is normalized to 1.00 mm.

In Embodiment 1 to Embodiment 6, a transparent curable silicone resin, which is a curable resin material, is used for the material of the first lens $L_1$ and the third lens $L_3$ constituting the first junction type compound lens 14, and for the material of the fourth lens $L_4$ and the sixth lens $L_6$ constituting the second junction type compound lens 16.

In Embodiment 1 to Embodiment 5, optical glass BK7, which is a high softening temperature optical glass material, is used for the material of the second lens $L_2$ and the fifth lens $L_5$. Here BK7 is a name assigned by Schott Glass Co. to a group of borosilicate glass. Optical glass BK7 is now manufactured by a plurality of glass manufacturers. The refractive index and the Abbe number of commercially available optical glass BK7 are somewhat different depending on the manufacturer and the manufacturing lot.

In Embodiment 6, the thermosetting silicone resin Silplus MHD, made by Nippon Steel Chemical Co., Ltd., which is a curable resin material, is used for the materials of the second lens $L_2$ and the fifth lens $L_5$.

The transparent curable silicone resin refers to a silicone resin which is transparent to visible lights and with which the geometric shape of a lens does not change, and optical performance does not deteriorate even if the environment temporarily becomes about a 150° C. high temperature. The transparent curable silicone resin mentioned here can be selected from silicone resins commercialized under the name "transparent high hardness silicone resin" by silicone resin suppliers, for example.

In Embodiment 1 to Embodiment 5, the first lens $L_1$ and the second lens $L_2$ are indirectly bonded, the second lens $L_2$ and the third lens $L_3$ are indirectly bonded. The fourth lens $L_4$ and the fifth lens $L_5$ are indirectly bonded, and the fifth lens $L_5$ and the sixth lens $L_6$ are indirectly bonded. In Embodiment 6, the first lens $L_1$ and the second lens $L_2$ are directly bonded or indirectly bonded, and the second lens $L_2$ and the third lens $L_3$ are directly bonded or indirectly bonded. The fourth lens $L_4$ and the fifth lens $L_5$ are directly bonded or indirectly bonded, and the fifth lens $L_5$ and the sixth lens $L_6$ are directly bonded or indirectly bonded.

For the curable resin material, which is a material of the first lens $L_1$, the third lens $L_3$, the fourth lens $L_4$ and the sixth lens $L_6$, SMX-7852 made by Fuji Polymer Industries Co., Ltd. and SR-7010 made by Dow Corning Toray Co., Ltd., which are thermosetting silicone resins, are used. The refractive indexes and the Abbe numbers of these thermosetting silicone resins differ depending on the manufacturer and also differ somewhat even if the product name is the same. In the following embodiments, a refractive index of a lens material is a value with respect to the d-line (light of which wavelength is 587.6 nm).

Epoxy adhesive can be used for an adhesive for indirect bonding. Specifically, a refractive index matching type optical adhesive (e.g. see <URL:http://keytech.ntt-at.co.jp/optic2/prd_1001.html> of NTT Advanced Technology Co. [searched on May 7, 2007]) can be used. This refractive index matching type optical adhesive has durability under heat, and even if the lens is temporarily placed in a high temperature environment, a form change, such as melting, does not occur, and the optical performance does not deteriorate. This refractive index matching type optical adhesive is transparent to visible lights, and the refractive index thereof can be adjusted in the range of 1.33 to 1.70 at a ±0.005 accuracy. As mentioned later, for the first to the sixth lenses constituting the junction type compound lens used for the imaging lens of the present embodiment, a material of which refractive index is in a 1.33 to 1.70 range is used. Therefore this refractive index matching type optical adhesive can be manufactured with controlling the refractive index thereof to be a value close to all the refractive indexes of the first to sixth lenses.

The adhesive to be used for indirect bonding is not limited to the above mentioned example of the refractive index matching type optical adhesive, but can be any adhesive which is transparent and which satisfies the conditions of the refractive index and heat resistance. A condition for the refractive index of the adhesive is that the refractive index of the adhesive is close to the refractive indexes of the two lenses to be bonded. A condition for the heat resistance is that even if the adhesive, which is solidified and is in a status of bonding the two lenses, is placed in a high temperature environment in the reflow step or is placed in an environment which temporarily becomes high temperature, a form change, such as melting, does not occur, and optical performance thereof does not change.

As FIG. 1 shows, the imaging lens of the present invention comprises a first diaphragm $S_1$, a first junction type compound lens 14, a second step $S_2$ and a second junction type compound lens 16, where the first diaphragm $S_1$, the first junction type compound lens 14, the second diaphragm $S_2$ and the second junction type compound lens 16 are arranged in this sequence from the object side to the image side.

The first junction type compound lens 14 comprises a first lens $L_1$, a second lens $L_2$ and a third lens $L_3$, which are arranged in this sequence from the object side to the image side. The second junction type compound lens 16 comprises a fourth lens $L_4$, a fifth lens $L_5$ and a sixth lens $L_6$, which are arranged in this sequence from the object side to the image side.

A cover glass 12 is inserted between the second junction type compound lens 16 and the image sensing element 10. A material of the cover glass is optical glass BK7 (made by Hoya Corporation) of which refractive index is 1.51680 and the Abbe number is 61.0.

Table 1 to Table 6 show the value $r_i$ (i=1, 2, 3, ..., 14) of the radius of curvature on the optical axis, surface spacing $d_i$ (i=1, 2, 3, ..., 13) and refractive index, Abbe number and aspherical surface coefficient of the lens composing material of the imaging lenses of Embodiment 1 to Embodiment 6. Here the composite focal distance by the first junction type compound lens and the second junction type compound lens is normalized to 1.0 mm.

The object side face of the first lens $L_1$ and the image side face of the third lens $L_3$ constituting the first junction type compound lens 14 are aspherical, and the object side face of the fourth lens $L_4$ and the image side face of the sixth lens $L_6$ constituting the second junction type compound lens 16 are aspherical.

EXAMPLE 1

TABLE 1

| Radius of Curvature($r_i$) | Distance($d_i$) | Refractivity($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.291$ | | | | −2.040e−1 | 3.890e−1 | −1.340e+1 | 1.868e+3 | −1.553e+4 |
| | $d_2 = 0.1096$ | $N_2 = 1.51000$ | $v_2 = 56.0$ | | | | | |
| $r_3 = \infty$ | | | | | | | | |
| | $d_3 = 0.0975$ | $N_3 = 1.51680$ | $v_3 = 61.0$ | | | | | |
| $r_4 = \infty$ | | | | | | | | |
| | $d_4 = 0.0122$ | $N_4 = 1.51000$ | $v_4 = 56.0$ | | | | | |
| $r_5 = 0.394$ | | | | −1.220e+1 | 2.600e+1 | −1.826e+2 | −3.062e+3 | 2.490e+5 |
| | $d_5 = 0.0560$ | | | | | | | |
| $r_6 = \infty$ | | | | | | | | |
| | $d_6 = 0.0210$ | | | | | | | |
| $r_7 = \infty$ | | | | | | | | |
| | $d_7 = 0.0526$ | | | | | | | |
| $r_8 = 1.331$ | | | | −1.650e+1 | −2.590 | −7.740e+1 | −3.630e+2 | 1.032e+4 |
| | $d_8 = 0.0390$ | $N_8 = 1.51000$ | $v_8 = 56.0$ | | | | | |
| $r_9 = \infty$ | | | | | | | | |
| | $d_9 = 0.0975$ | $N_9 = 1.51680$ | $v_9 = 61.0$ | | | | | |
| $r_{10} = \infty$ | | | | | | | | |
| | $d_{10} = 0.0853$ | $N_{10} = 1.51000$ | $v_{10} = 56.0$ | | | | | |
| $r_{11} = 7.500$ | | | | −1.000e+5 | 1.800 | −6.800e+1 | 3.840e+2 | −1.358e+3 |
| | $d_{11} = 0.1437$ | | | | | | | |

TABLE 1-continued

| Radius of Curvature($r_i$) | Distance($d_i$) | Refractivity($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_{12} = \infty$ | | | | | | | | |
| | $d_{12} = 0.1462$ | $N_{12} = 1.51680$ | $v_{12} = 61.0$ | | | | | |
| $r_{13} = \infty$ | | | | | | | | |
| | $d_{13} = 0.2523$ | | | | | | | |

Focal Length f = 1.00 mm
F-Number $F_{no}$ = 2.9
Image Height 2Y = 1.246 mm

EXAMPLE 2

TABLE 2

| Radius of Curvature($r_i$) | Distance($d_i$) | Refractivity($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.304$ | | | | $-2.040e-1$ | $3.400e-1$ | $-1.070e+1$ | $1.365e+3$ | $-1.037e+4$ |
| | $d_2 = 0.1147$ | $N_2 = 1.53000$ | $v_2 = 35.0$ | | | | | |
| $r_3 = \infty$ | | | | | | | | |
| | $d_3 = 0.1019$ | $N_3 = 1.51680$ | $v_3 = 61.0$ | | | | | |
| $r_4 = \infty$ | | | | | | | | |
| | $d_4 = 0.0127$ | $N_4 = 1.53000$ | $v_4 = 35.0$ | | | | | |
| $r_5 = 0.412$ | | | | $-1.220e+1$ | $2.273e+1$ | $-1.460e+2$ | $-2.237e+3$ | $1.663e+5$ |
| | $d_5 = 0.0586$ | | | | | | | |
| $r_6 = \infty$ | | | | | | | | |
| | $d_6 = 0.0219$ | | | | | | | |
| $r_7 = \infty$ | | | | | | | | |
| | $d_7 = 0.0550$ | | | | | | | |
| $r_8 = 1.392$ | | | | $-1.650e+1$ | $-2.266$ | $-6.190e+1$ | $-2.650e+2$ | $6.890e+3$ |
| | $d_8 = 0.0408$ | $N_8 = 1.53000$ | $v_8 = 35.0$ | | | | | |
| $r_9 = \infty$ | | | | | | | | |
| | $d_9 = 0.1019$ | $N_9 = 1.51680$ | $v_9 = 61.0$ | | | | | |
| $r_{10} = \infty$ | | | | | | | | |
| | $d_{10} = 0.0892$ | $N_{10} = 1.53000$ | $v_{10} = 35.0$ | | | | | |
| $r_{11} = 7.844$ | | | | $-1.009e+5$ | $1.571$ | $-5.440e+1$ | $2.807e+2$ | $-9.069e+2$ |
| | $d_{11} = 0.1503$ | | | | | | | |
| $r_{12} = \infty$ | | | | | | | | |
| | $d_{12} = 0.1529$ | $N_{12} = 1.51680$ | $v_{12} = 61.0$ | | | | | |
| $r_{13} = \infty$ | | | | | | | | |
| | $d_{13} = 0.2224$ | | | | | | | |

Focal Length f = 1.00 mm
F-Number $F_{no}$ = 2.9
Image Height 2Y = 1.238 mm

EXAMPLE 3

TABLE 3

| Radius of Curvature($r_i$) | Distance($d_i$) | Refractivity($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.291$ | | | | $-2.040e-1$ | $3.870e-1$ | $-1.330e+1$ | $1.849e+3$ | $-1.532e+4$ |
| | $d_2 = 0.1098$ | $N_2 = 1.51000$ | $v_2 = 56.0$ | | | | | |
| $r_3 = 1.952$ | | | | | | | | |
| | $d_3 = 0.0976$ | $N_3 = 1.51680$ | $v_3 = 61.0$ | | | | | |
| $r_4 = -1.952$ | | | | | | | | |
| | $d_4 = 0.0122$ | $N_4 = 1.51000$ | $v_4 = 56.0$ | | | | | |
| $r_5 = 0.394$ | | | | $-1.220e+1$ | $2.590e+1$ | $-1.810e+2$ | $-3.031e+3$ | $2.457e+5$ |
| | $d_5 = 0.0561$ | | | | | | | |
| $r_6 = \infty$ | | | | | | | | |
| | $d_6 = 0.0210$ | | | | | | | |
| $r_7 = \infty$ | | | | | | | | |
| | $d_7 = 0.0527$ | | | | | | | |

TABLE 3-continued

| Radius of Curvature($r_i$) | Distance($d_i$) | Refractivity($N_i$) | Abbe Number($v_i$) | Aspheric Coefficients |||||
|---|---|---|---|---|---|---|---|---|
| | | | | K | $A_4$ | $A_6$ | $A_8$ | $A_{10}$ |
| $r_8 = 1.333$ | | | | $-1.650e+1$ | $-2.580$ | $-7.690e+1$ | $-3.600e+2$ | $1.019e+4$ |
| | $d_8 = 0.0390$ | $N_8 = 1.51000$ | $v_8 = 56.0$ | | | | | |
| $r_9 = -1.952$ | | | | | | | | |
| | $d_9 = 0.0778$ | $N_9 = 1.51680$ | $v_9 = 61.0$ | | | | | |
| $r_{10} = 1.952$ | | | | | | | | |
| | $d_{10} = 0.1052$ | $N_{10} = 1.51000$ | $v_{10} = 56.0$ | | | | | |
| $r_{11} = 7.511$ | | | | $-1.009e+5$ | $1.790$ | $-6.750e+1$ | $3.803e+2$ | $-1.340e+3$ |
| | $d_{11} = 0.1439$ | | | | | | | |
| $r_{12} = \infty$ | | | | | | | | |
| | $d_{12} = 0.1464$ | $N_{12} = 1.51680$ | $v_{12} = 61.0$ | | | | | |
| $r_{13} = \infty$ | | | | | | | | |
| | $d_{13} = 0.2505$ | | | | | | | |

Focal Length f = 1.00 mm
F-Number $F_{no}$ = 2.9
Image Height 2Y = 1.200 mm

EXAMPLE 4

TABLE 4

| Radius of Curvature($r_i$) | Distance($d_i$) | Refractivity($N_i$) | Abbe Number($v_i$) | Aspheric Coefficients |||||
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.291$ | | | | $-2.040e-1$ | $3.880e-1$ | $-1.340e+1$ | $1.862e+3$ | $-1.546e+4$ |
| | $d_2 = 0.1097$ | $N_2 = 1.51000$ | $v_2 = 56.0$ | | | | | |
| $r_3 = 1.950$ | | | | | | | | |
| | $d_3 = 0.0975$ | $N_3 = 1.51680$ | $v_3 = 61.0$ | | | | | |
| $r_4 = 1.950$ | | | | | | | | |
| | $d_4 = 0.0122$ | $N_4 = 1.51000$ | $v_4 = 56.0$ | | | | | |
| $r_5 = 0.394$ | | | | $-1.220e+1$ | $2.600e+1$ | $-1.820e+2$ | $-3.050e+3$ | $2.480e+5$ |
| | $d_5 = 0.0560$ | | | | | | | |
| $r_6 = \infty$ | | | | | | | | |
| | $d_6 = 0.0210$ | | | | | | | |
| $r_7 = \infty$ | | | | | | | | |
| | $d_7 = 0.0527$ | | | | | | | |
| $r_8 = 1.332$ | | | | $-1.650e+1$ | $-2.590$ | $-7.720e+1$ | $-3.620e+2$ | $1.030e+4$ |
| | $d_8 = 0.0390$ | $N_8 = 1.51000$ | $v_8 = 56.0$ | | | | | |
| $r_9 = -1.950$ | | | | | | | | |
| | $d_9 = 0.1365$ | $N_9 = 1.51680$ | $v_9 = 61.0$ | | | | | |
| $r_{10} = -1.950$ | | | | | | | | |
| | $d_{10} = 0.0463$ | $N_{10} = 1.51000$ | $v_{10} = 56.0$ | | | | | |
| $r_{11} = 7.504$ | | | | $-1.010e+5$ | $1.790$ | $-6.790e+1$ | $3.830e+2$ | $-1.350e+3$ |
| | $d_{11} = 0.1437$ | | | | | | | |
| $r_{12} = \infty$ | | | | | | | | |
| | $d_{12} = 0.1463$ | $N_{12} = 1.51680$ | $v_{12} = 61.0$ | | | | | |
| $r_{13} = \infty$ | | | | | | | | |
| | $d_{13} = 0.2524$ | | | | | | | |

Focal Length f = 1.00 mm
F-Number $F_{no}$ = 2.9
Image Height 2Y = 1.200 mm

EXAMPLE 5

TABLE 5

| Radius of Curvature($r_i$) | Distance($d_i$) | Refractivity($N_i$) | Abbe Number($v_i$) | Aspheric Coefficients |||||
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.290$ | | | | $-2.040e-1$ | $3.910e-1$ | $-1.350e+1$ | $1.894e+3$ | $-1.580e+4$ |
| | $d_2 = 0.1094$ | $N_2 = 1.51000$ | $v_2 = 56.0$ | | | | | |
| $r_3 = -1.946$ | | | | | | | | |
| | $d_3 = 0.0973$ | $N_3 = 1.51680$ | $v_3 = 61.0$ | | | | | |

TABLE 5-continued

| Radius of Curvature($r_i$) | Distance($d_i$) | Refractivity($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_4 = 1.946$ | | | | | | | | |
| | $d_4 = 0.0122$ | $N_4 = 1.51000$ | $v_4 = 56.0$ | | | | | |
| $r_5 = 0.393$ | | | | $-1.220e+1$ | $2.620e+1$ | $-1.840e+2$ | $-3.104e+3$ | $2.534e+5$ |
| | $d_5 = 0.0559$ | | | | | | | |
| $r_6 = \infty$ | | | | | | | | |
| | $d_6 = 0.0209$ | | | | | | | |
| $r_7 = \infty$ | | | | | | | | |
| | $d_7 = 0.0525$ | | | | | | | |
| $r_8 = 1.329$ | | | | $-1.650e+1$ | $-2.610$ | $-7.820e+1$ | $-3.680e+2$ | $1.050e+4$ |
| | $d_8 = 0.0389$ | $N_8 = 1.51000$ | $v_8 = 56.0$ | | | | | |
| $r_9 = 1.946$ | | | | | | | | |
| | $d_9 = 0.1362$ | $N_9 = 1.51680$ | $v_9 = 61.0$ | | | | | |
| $r_{10} = -1.946$ | | | | | | | | |
| | $d_{10} = 0.0462$ | $N_{10} = 1.51000$ | $v_{10} = 56.0$ | | | | | |
| $r_{11} = 7.485$ | | | | $-1.010e+5$ | $1.810$ | $-6.870e+1$ | $3.890e+2$ | $-1.382e+3$ |
| | $d_{11} = 0.1434$ | | | | | | | |
| $r_{12} = \infty$ | | | | | | | | |
| | $d_{12} = 0.1459$ | $N_{12} = 1.51680$ | $v_{12} = 61.0$ | | | | | |
| $r_{13} = \infty$ | | | | | | | | |
| | $d_{13} = 0.2544$ | | | | | | | |

Focal Length f = 1.00 mm
F-Number $F_{no}$ = 2.9
Image Height 2Y = 1.218 mm

EXAMPLE 6

TABLE 6

| Radius of Curvature($r_i$) | Distance($d_i$) | Refractivity($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.2909$ | | | | $-2.040e-1$ | $3.890e-1$ | $-1.340e+1$ | $1.868e+3$ | $-1.553e+4$ |
| | $d_2 = 0.1096$ | $N_2 = 1.51000$ | $v_2 = 56.0$ | | | | | |
| $r_3 = \infty$ | | | | | | | | |
| | $d_3 = 0.0975$ | $N_3 = 1.51100$ | $v_3 = 36.0$ | | | | | |
| $r_4 = \infty$ | | | | | | | | |
| | $d_4 = 0.0122$ | $N_4 = 1.51000$ | $v_4 = 56.0$ | | | | | |
| $r_5 = 0.3938$ | | | | $-1.220e+1$ | $2.600e+1$ | $-1.826e+2$ | $-3.062e+3$ | $2.490e+5$ |
| | $d_5 = 0.0560$ | | | | | | | |
| $r_6 = \infty$ | | | | | | | | |
| | $d_6 = 0.0210$ | | | | | | | |
| $r_7 = \infty$ | | | | | | | | |
| | $d_7 = 0.0526$ | | | | | | | |
| $r_8 = 1.3314$ | | | | $-1.650e+1$ | $-2.590$ | $-7.740e+1$ | $-3.630e+2$ | $1.032e+4$ |
| | $d_8 = 0.0390$ | $N_8 = 1.51000$ | $v_8 = 56.0$ | | | | | |
| $r_9 = \infty$ | | | | | | | | |
| | $d_9 = 0.0975$ | $N_9 = 1.51100$ | $v_9 = 36.0$ | | | | | |
| $r_{10} = \infty$ | | | | | | | | |
| | $d_{10} = 0.0853$ | $N_{10} = 1.51000$ | $v_{10} = 56.0$ | | | | | |
| $r_{11} = 7.5000$ | | | | $-1.000e+5$ | $1.800$ | $-6.800e+1$ | $3.840e+2$ | $-1.358e+3$ |
| | $d_{11} = 0.1437$ | | | | | | | |
| $r_{12} = \infty$ | | | | | | | | |
| | $d_{12} = 0.1462$ | $N_{12} = 1.51633$ | $v_{12} = 64.0$ | | | | | |
| $r_{13} = \infty$ | | | | | | | | |
| | $d_{13} = 0.2513$ | | | | | | | |
| $r_{14} = \infty$ | | | | | | | | |
| | $d_{14} = -0.0100$ | | | | | | | |

Focal Length f = 1.00 mm
F-Number $F_{no}$ = 2.9
Image Height 2Y = 1.246 mm

The junction type compound lenses used in Embodiment 1 to Embodiment 5 are manufactured by indirectly bonding lenses. This indirect bonding is implemented by using an adhesive between lenses. Since this procedure is the same for both the first junction type compound lens and the second junction type compound lens, the first junction type compound lens will be described here as an example. In this case, the first to the third lenses $L_1$ to $L_3$ are formed first, then adhesive is coated on the surface of the second lens $L_2$ facing the first lens $L_1$ or the third lens $L_3$, or on the surface of the first lens $L_1$ or the third lens $L_3$, facing the second lens $L_2$, and both lenses are contacted.

Coating could be performed at least on one surface of the second lens $L_2$ facing the first lens $L_1$ or the third lens $L_3$, then both lenses are bonded. In this case, indirect bonding or direct bonding, mentioned below, could be performed after the coating processing.

The junction type compound lens used for Embodiment 6 is manufactured by directly bonding or indirectly bonding lenses.

To manufacture the junction type compound lens by direct bonding, the following steps are performed (for details, see U.S. Pat. No. 3,926,380). In this case as well, the procedure is the same for the first junction type compound lens and the second junction type compound lens, so the first junction type compound lens will be described here as an example.

A die for forming the first lens $L_1$, that can be bonded to the second lens $L_2$, is prepared. This die is a cylinder where the side wall of the inner face is cylindrical, and the bottom face is a curved shape, the same as the object side face of the first lens $L_1$. A transparent curable silicone resin, which is in a liquid state before curing, is injected into the die, and thermo-curing processing or UV curing processing is performed to form the first lens $L_1$, and the first lens $L_1$ is bonded to the second lens $L_2$.

Then a die for forming the third lens $L_3$, which is bonded to the above compound lens where the first lens $L_1$ and the second lens $L_2$ are bonded, is prepared. The bottom face of this die has a shape the same as the image face of the third lens $L_3$. A transparent curable silicone resin, which is in a liquid state before curing, is injected into the die, thermo-curing processing or UV curing processing is performed to form the third lens $L_3$, and the third lens $L_3$ is bonded to the second lens $L_2$, where the first lens $L_1$ is bonded. Thus the junction type compound lens is formed.

In the above mentioned manufacturing steps of the junction type compound lens, if the first lens $L_1$ and the third lens $L_3$ are formed by thermosetting resin material, a temperature control device for increasing the temperature of the dies and controlling processing is required. If the first lens $L_1$ and the third lens $L_3$ are formed by a UV-curable resin, the manufacturing device for the junction type compound lens is designed so that ultraviolet can be irradiated onto the UV-curable resin from an area above the die.

Embodiment 1

In the lens system of Embodiment 1, the first lens $L_1$ and the third lens $L_3$ of the first junction type compound lens are formed of transparent curable silicone resin SMX-7852 (made by Fuji Polymer Industries Co., Ltd.), and the second lens $L_2$ is formed of optical glass BK7 (made by Ohara Inc.). The fourth lens $L_4$ and the sixth lens $L_6$ of the second junction type compound lens are formed of a transparent curable silicone resin SMX-7852 (made by Fuji Polymer Industries Co., Ltd.), and the fifth lens $L_5$ is formed of optical glass BK7 (made by Ohara Inc.).

(A) The refractive index $N_2$ of the first lens $L_1$ is $N_2$=1.51000.
(B) The refractive index $N_3$ of the second lens $L_2$ is $N_3$=1.51680.
(C) The refractive index $N_4$ of the third lens $L_3$ is $N_4$=1.51000.
(D) The Abbe number $v_2$ of the first lens $L_1$ is $v_2$=56.0.
(E) The Abbe number $v_3$ of the second lens $L_2$ is $v_3$=61.0.
(F) The Abbe number $v_4$ of the third lens $L_3$ is $v_4$=56.0.
(G) The refractive index $N_8$ of the fourth lens $L_4$ is $N_8$=1.51000.
(H) The refractive index $N_9$ of the fifth lens $L_5$ is $N_9$=1.51680.
(I) The refractive index $N_{10}$ of the sixth lens $L_6$ is $N_{10}$=1.51000.
(J) The Abbe number $v_8$ of the fourth lens $L_4$ is $v_8$=56.0.
(K) The Abbe number $v_9$ of the fifth lens $L_5$ is $v_9$=61.0.
(L) The Abbe number $v_{10}$ of the sixth lens $L_6$ is $v_{10}$=56.0.

Therefore $|N_3-N_2|=|N_3-N_4|=|N_9-N_8|=|N_9-N_{10}|=0.00680$, which satisfies the following Conditions (1), (2), (5) and (6). Also $|v_3-v_2|=|v_3-v_4|=|v_9-v_8|=|v_9-v_{10}|=5.0$, which satisfies the following Conditions (3), (4), (7) and (8).

The Conditions (1), (2), (5) and (6) refer to conditions given by Expressions (1), (2), (5) and (6) respectively. The Conditions (3), (4), (7) and (8) refer to Conditions given by Expressions (3), (4), (7) and (8) respectively.

$$0 \leq |N_3-N_2| \leq 0.1 \quad (1)$$

$$0 \leq |N_3-N_4| \leq 0.1 \quad (2)$$

$$0 \leq |v_3-v_2| \leq 30.0 \quad (3)$$

$$0 \leq |v_3-v_4| \leq 30.0 \quad (4)$$

$$0 \leq |N_9-N_8| \leq 0.1 \quad (5)$$

$$0 \leq |N_9-N_{10}| \leq 0.1 \quad (6)$$

$$0 \leq |v_9-v_8| \leq 30.0 \quad (7)$$

$$0 \leq |v_9-v_{10}| \leq 30.0 \quad (8)$$

The Conditions (1) to (8) refer to the conditions given by Expressions (1) to (8) respectively, which is the same for the description herein below (description on Embodiment 2 to Embodiment 6).

Figure 2:
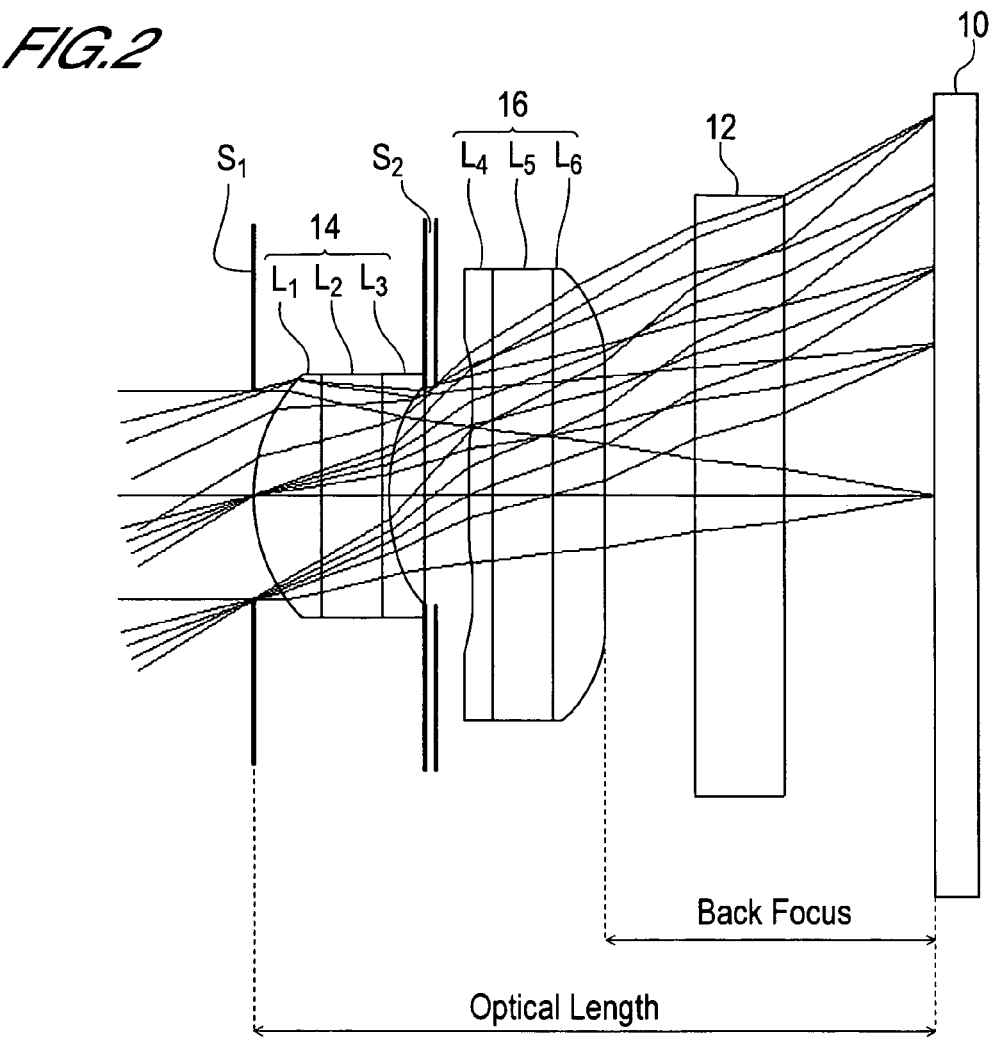
FIG. 2 is a cross-sectional view depicting an imaging lens according to Embodiment 1.

FIG. 2 is a cross-sectional view of the imaging lens of Embodiment 1. As FIG. 2 shows, the first diaphragm $S_1$ to play a role of an aperture diaphragm is formed at a position of an intersection of the first surface (surface at the object side) of the first lens $L_1$ constituting the first junction type compound lens 14 and the optical axis. The second diaphragm $S_2$ to play a role of preventing a flare or smear is formed between the first junction type compound lens 14 and the second junction type compound lens 16.

The diaphragm surface of the first diaphragm $S_1$ is a plane, so $r_1=\infty$ is indicated in Table 1. The second diaphragm $S_2$ is comprised of a plane $r_6$ and $r_7$, so $r_6=\infty$ and $r_7=\infty$ are indicated in Table 1. The F number Fno is 2.9.

As Table 1 shows, $r_3=\infty$ and $r_4=\infty$, so the second lens $L_2$ is an optical-parallel plate, and $r_9=\infty$ and $r_{10}=\infty$, so the fifth lens $L_5$ is an optical-parallel plate. $r_2$ is a positive value and $r_5$ is a positive value, so the first lens $L_1$ is a plano-convex lens where the object side face of this first lens $L_1$ is a convex surface facing the object side on a paraxial line, and the third lens $L_3$ is a plano-concave lens where the image side face of this third lens $L_3$ is a concave surface facing the image side on a paraxial line. $r_8$ is a positive value and $r_{11}$ is also a positive value, so the fourth lens $L_4$ is a plano-convex lens where the object side face of this fourth lens $L_4$ is a convex surface facing the object side on a paraxial line, and the sixth lens $L_6$ is a plano-concave lens where the image side face of this sixth lens $L_6$ is a concave surface facing the image side on a paraxial line.

In Embodiment 1, the optical length L with respect to the focal distance f=1.00 mm is 1.113 mm, and the back focus bf is 0.492 mm.

Figure 3:
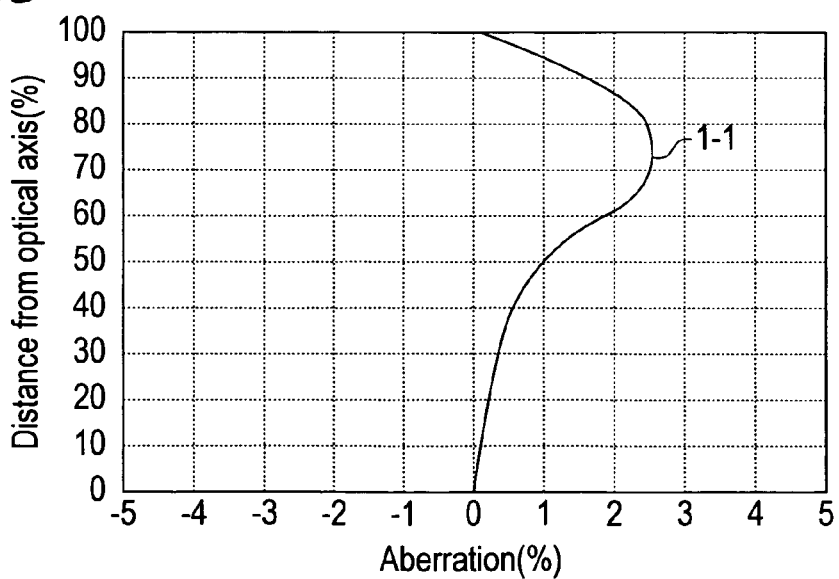
FIG. 3 is a diagram depicting the distortion aberration of the imaging lens of Embodiment 1.
Figure 4:
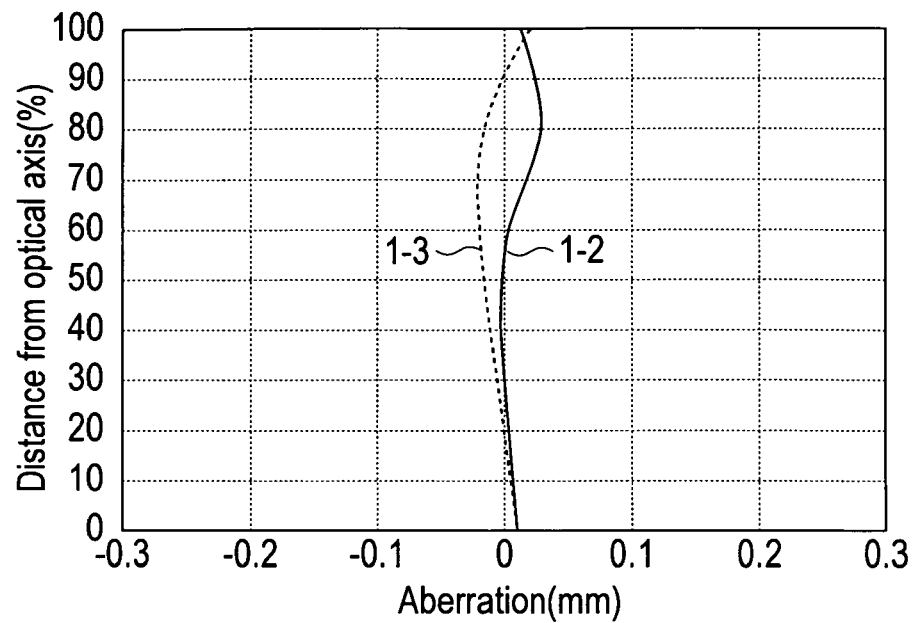
FIG. 4 is a diagram depicting the astigmatism aberration of the imaging lens of Embodiment 1.
Figure 5:
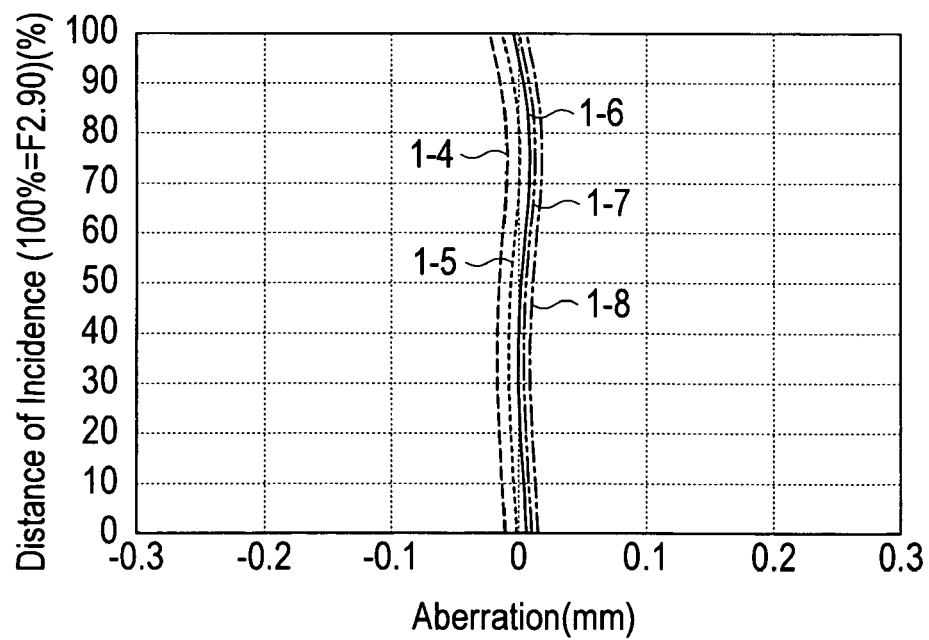
FIG. 5 is a diagram depicting the chromatic/spherical aberration of the imaging lens of Embodiment 1.

FIG. 3 shows a graph of the distortion aberration curve 1-1, FIG. 4 shows a graph of the astigmatism aberration curve (aberration curve 1-2 on the meridional surface and aberration curve 1-3 on the sagittal surface), and FIG. 5 shows a graph of a chromatic/spherical aberration curve (aberration curve 1-4 on g-line, aberration curve 1-5 on F-line, aberration curve 1-6 on e-line, aberration curve 1-7 on d-line and aberration curve 1-8 on C-line).

The ordinates of the aberration curves in FIG. 3 and FIG. 4 show the image height by a % of the distance from the optical axis. In FIG. 3 and FIG. 4, 100% corresponds to 0.623 mm. The ordinate of the aberration curve in FIG. 5 shows the entrance height h (F number), and the maximum thereof corresponds to 2.9. The abscissa of FIG. 3 shows the aberration (%), and the abscissa of FIG. 4 and FIG. 5 show the value of the aberration (mm).

For the distortion aberration, the absolute value of the aberration is 2.5%, which is the maximum, at the position of 75% image height (image height: 0.467 mm), and the absolute value of the aberration is within 2.5% in a range where the image height is 0.623 mm or less.

For the astigmatism aberration, the absolute value of the aberration on the meridional surface is 0.029 mm, which is the maximum, at the position of 80% image height (image height: 0.498 mm), and the absolute value of the aberration is within 0.029 mm in a range where the image height is 0.623 mm or less.

For the chromatic/spherical aberration, the absolute value of the aberration curve 1-4 on the g-line is 0.0225 mm, which is the maximum at the 100% entrance height h, and the absolute value of the aberration is within 0.0225 mm.

Therefore according to the imaging lens of Embodiment 1, the optical length can be short enough to be installed in a portable telephone or the like, the back focus can be long enough to insert such components as a filter and cover glass between the imaging lens and the imaging plane, and good images can be acquired.

Embodiment 2

In the lens system of Embodiment 2, the first lens $L_1$ and the third lens $L_3$ of the first junction type compound lens are formed of transparent curable silicone resin SR-7010 (Dow Corning Toray Co., Ltd.), and the second lens $L_2$ is formed of optical glass BK7 (made by Ohara Inc.). The fourth lens $L_4$ and the sixth lens $L_6$ of the second junction type compound lens are formed of transparent curable silicone resin SR-7010 (Dow Corning Toray Co., Ltd.), and the fifth lens $L_5$ is formed of optical glass BK7 (made by Ohara Inc.).
(A) The refractive index $N_2$ of the first lens $L_1$ is $N_2$=1.53000.
(B) The refractive index $N_3$ of the second lens $L_2$ is $N_3$=1.51680.
(C) The refractive index $N_4$ of the third lens $L_3$ is $N_4$=1.53000.
(D) The Abbe number $v_2$ of the first lens $L_1$ is $v_2$=35.0.
(E) The Abbe number $v_3$ of the second lens $L_2$ is $v_3$=61.0.
(F) The Abbe number $v_4$ of the third lens $L_3$ is $v_4$=35.0.
(G) The refractive index $N_8$ of the fourth lens $L_4$ is $N_8$=1.53000.
(H) The refractive index $N_9$ of the fifth lens $L_5$ is $N_9$=1.51680.
(I) The refractive index $N_{10}$ of the sixth lens $L_6$ is $N_{10}$=1.53000.
(J) The Abbe number $v_8$ of the fourth lens $L_4$ is $v_8$=35.0.
(K) The Abbe number $v_9$ of the fifth lens $L_5$ is $v_9$=61.0.
(L) The Abbe number $v_{10}$ of the sixth lens $L_6$ is $v_{10}$=35.0.
Therefore $|N_3-N_2|=|N_3-N_4|=|N_9-N_8|=|N_9-N_{10}|=0.01320$, which satisfies the following Conditions (1), (2), (5) and (6). Also $|v_3-v_2|=|v_3-v_4|=|v_9-v_8|=|v_9-v_{10}|=26.0$, which satisfies the following Conditions (3), (4), (7) and (8).

Figure 6:
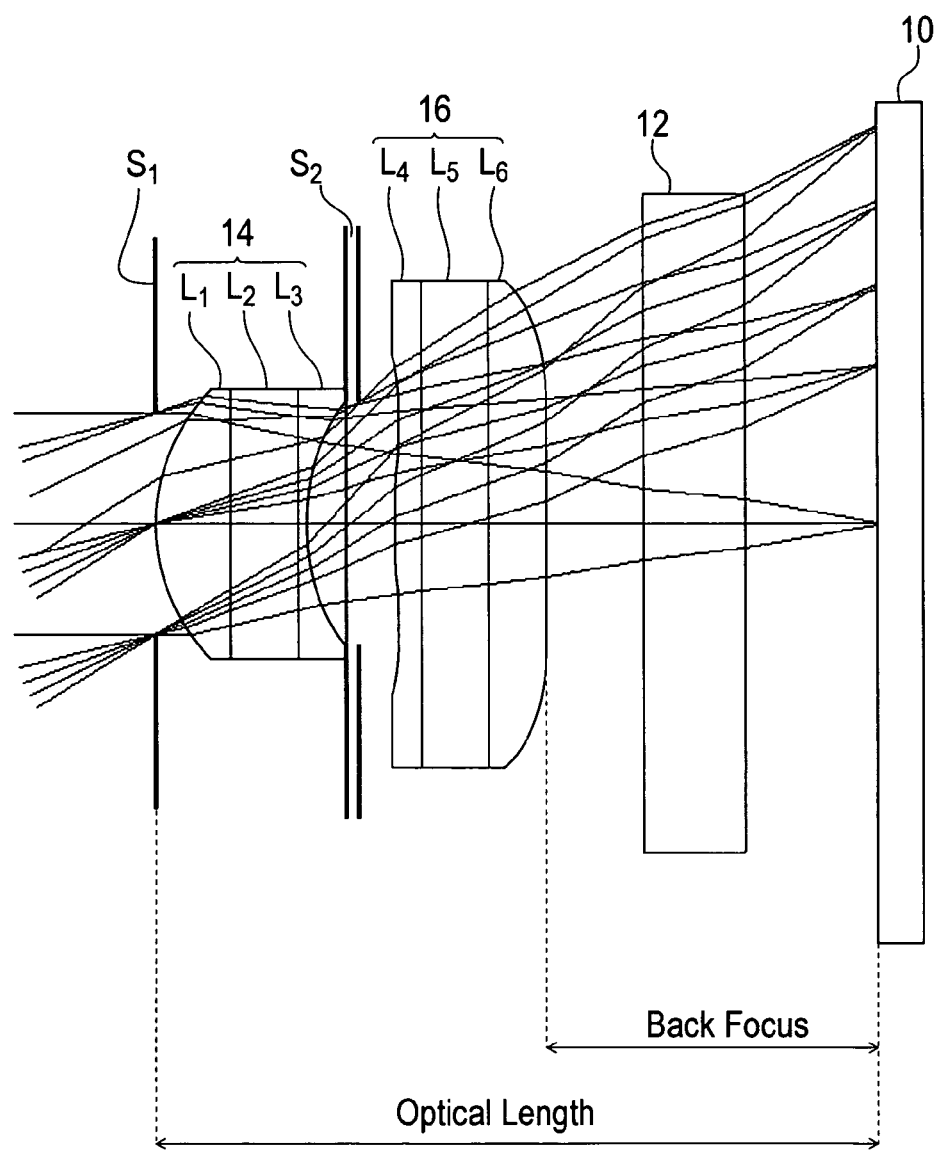
FIG. 6 is a cross-sectional view depicting an imaging lens according to Embodiment 2.

FIG. 6 is a cross-sectional view of the imaging lens of Embodiment 2. As FIG. 6 shows, the first diaphragm $S_1$ to play a role of an aperture diaphragm is formed at a position of an intersection of the first surface (surface at the object side) of the first lens $L_1$ constituting the first junction type compound lens 14 and the optical axis. The second diaphragm $S_2$ to play a role of preventing a flare or smear is formed between the first junction type compound lens 14 and the second junction type compound lens 16.

The diaphragm surface of the first diaphragm $S_1$ is a plane, so $r_1=\infty$ is indicated in Table 2. The second diaphragm $S_2$ is comprised of planes $r_6$ and $r_7$, so $r_6=\infty$ and $r_7=\infty$ are indicated in Table 2. The F number Fno is 2.9.

As Table 2 shows, $r_3=\infty$ and $r_4=\infty$, so the second lens $L_2$ is an optical-parallel plate, and $r_9=\infty$ and $r_{10}=\infty$, so the fifth lens $L_5$ is an optical-parallel plate. $r_2$ is a positive value and $r_5$ is a positive value, so the first lens $L_1$ is a plano-convex lens where the object side face of this first lens $L_1$ is a convex surface facing the object side on a paraxial line, and the third lens $L_3$ is a plano-concave lens where the image side face of this third lens $L_3$ is a concave surface facing the image side on a paraxial line. $r_8$ is a positive value and $r_{11}$ is also a positive value, so the fourth lens $L_4$ is a plano-convex lens where the object side face of this fourth lens $L_4$ is a convex surface facing the object side on a paraxial line, and the sixth lens $L_6$ is a plano-concave lens where the image side face of this sixth lens $L_6$ is a concave surface facing the image side on a paraxial line.

In Embodiment 2, the optical length L with respect to the focal distance f=1.00 mm is 1.120 mm, and the back focus bf is 0.472 mm.

Figure 7:
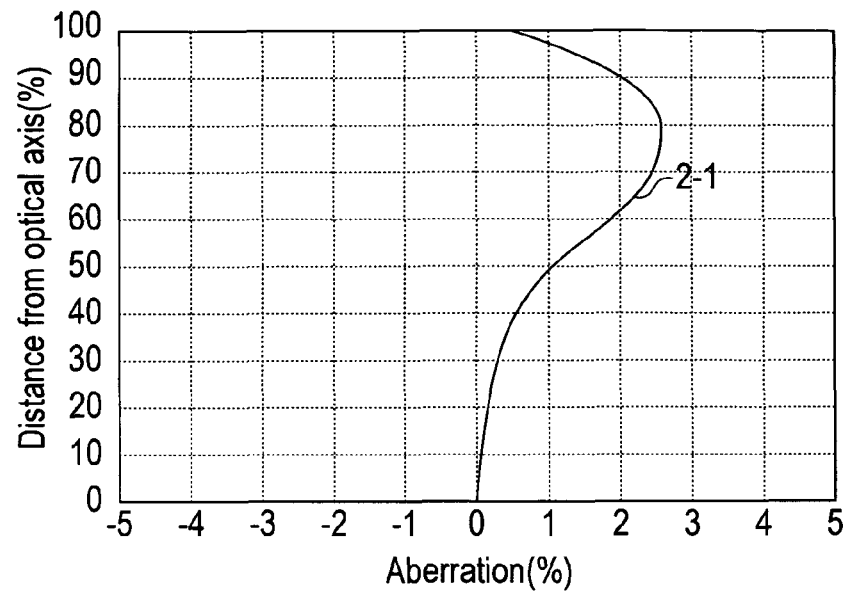
FIG. 7 is a diagram depicting the distortion aberration of the imaging lens of Embodiment 2.
Figure 8:
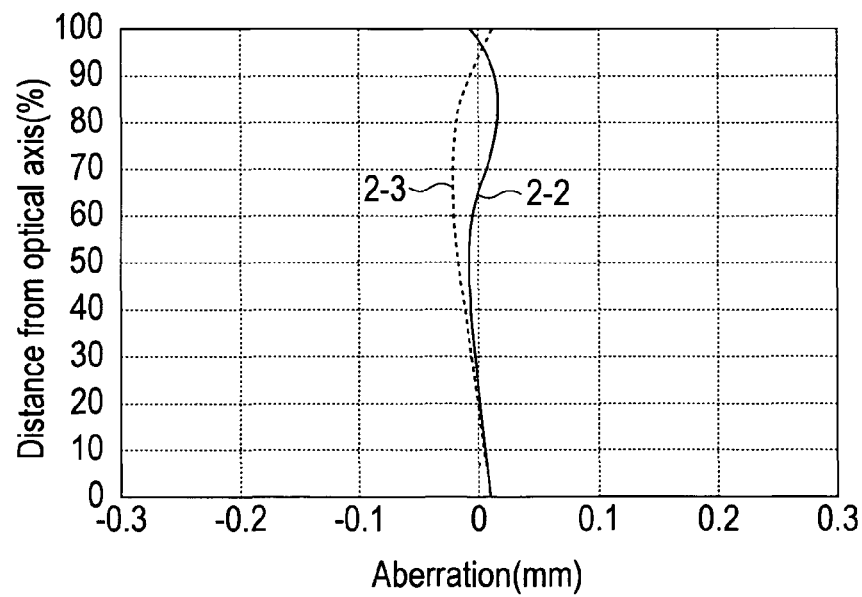
FIG. 8 is a diagram depicting the astigmatism aberration of the imaging lens of Embodiment 2.
Figure 9:
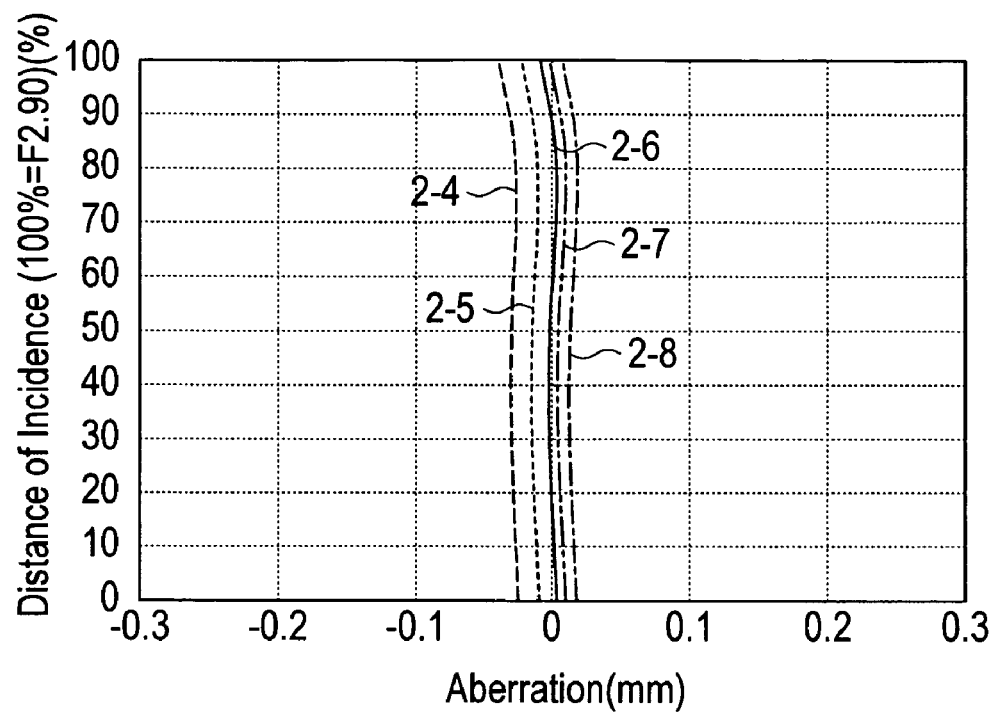
FIG. 9 is a diagram depicting the chromatic/spherical aberration of the imaging lens of Embodiment 2.

FIG. 7 shows a graph of the distortion aberration curve 2-1, FIG. 8 shows a graph of the astigmatism aberration curve (aberration curve 2-2 on the meridional surface and aberration curve 2-3 on the sagittal surface), and FIG. 9 shows a graph of a chromatic/spherical aberration curve (aberration curve 2-4 on g-line, aberration curve 2-5 on F-line, aberration curve 2-6 on e-line, aberration curve 2-7 on d-line and aberration curve 2-8 on C-line).

The ordinates of the aberration curves in FIG. 7 and FIG. 8 show the image height by a % of the distance from the optical axis. In FIG. 7 and FIG. 8, 100% corresponds to 0.619 mm. The ordinate of the aberration curve in FIG. 9 shows the entrance height h (F number), and the maximum thereof corresponds to 2.9. The abscissa of FIG. 7 shows the aberration (%), and the abscissa of FIG. 8 and FIG. 9 show the value of the aberration (mm).

For the distortion aberration, the absolute value of the aberration is 2.7%, which is the maximum, at the position of 75% image height (image height: 0.464 mm), and the absolute value of the aberration is within 2.7% in a range where the image height is 0.619 mm or less.

For the astigmatism aberration, the absolute value of the aberration on the sagittal surface is 0.02 mm, which is the maximum, at the position of 70% image height (image height: 0.433 mm), and the absolute value of the aberration is within 0.02 mm in a range where the image height is 0.619 mm or less.

For the chromatic/spherical aberration, the absolute value of the aberration curve 2-4 on the g-line is 0.0398 mm, which is the maximum, at the 100% entrance height h the absolute value of the aberration is within 0.0398 mm.

Therefore according to the imaging lens of Embodiment 2, the optical length can be short enough to be installed in a portable telephone or the like, the back focus can be long enough to insert such components as a filter and cover glass between the imaging lens and the imaging plane, and good images can be acquired.

Embodiment 3

In the lens system of Embodiment 3, the first lens $L_1$ and the third lens $L_3$ of the first junction type compound lens are formed of transparent curable silicone resin SIX-7852 (made by Fuji Polymer Industries Co., Ltd.), and the second lens $L_2$ is formed of optical glass BK7 (made by Ohara Inc.). The fourth lens $L_4$ and the sixth lens $L_6$ of the second junction type compound lens are formed of a transparent curable silicone resin SMX-7852 (made by Fuji Polymer Industries Co., Ltd.), and the fifth lens $L_5$ is formed of optical glass BK7 (made by Ohara Inc.).

(A) The refractive index $N_2$ of the first lens $L_1$ is $N_2$=1.51000.
(B) The refractive index $N_3$ of the second lens $L_2$ is $N_3$=1.51680.
(C) The refractive index $N_4$ of the third lens $L_3$ is $N_4$=1.51000.
(D) The Abbe number $v_2$ of the first lens $L_1$ is $v_2$=56.0.
(E) The Abbe number $v_3$ of the second lens $L_2$ is $v_3$=61.0.
(F) The Abbe number $v_4$ of the third lens $L_3$ is $v_4$=56.0.
(G) The refractive index $N_8$ of the fourth lens $L_4$ is $N_8$=1.51000.
(H) The refractive index $N_9$ of the fifth lens $L_5$ is $N_9$=1.51680.
(I) The refractive index $N_{10}$ of the sixth lens $L_6$ is $N_{10}$=1.51000.
(J) The Abbe number $v_8$ of the fourth lens $L_4$ is $v_8$=56.0.
(K) The Abbe number $v_9$ of the fifth lens $L_5$ is $v_9$=61.0.
(L) The Abbe number $v_{10}$ of the sixth lens $L_6$ is $v_{10}$=56.0.

Therefore $|N_3-N_2|=|N_3-N_4|=|N_9-N_8|=|N_9-N_{10}|=0.00680$, which satisfies the following Conditions (1), (2), (5) and (6). Also $|v_3-v_2|=|v_3-v_4|=|v_9-v_8|=|v_9-v_{10}|=5.0$, which satisfies the following Conditions (3), (4), (7) and (8).

Figure 10:
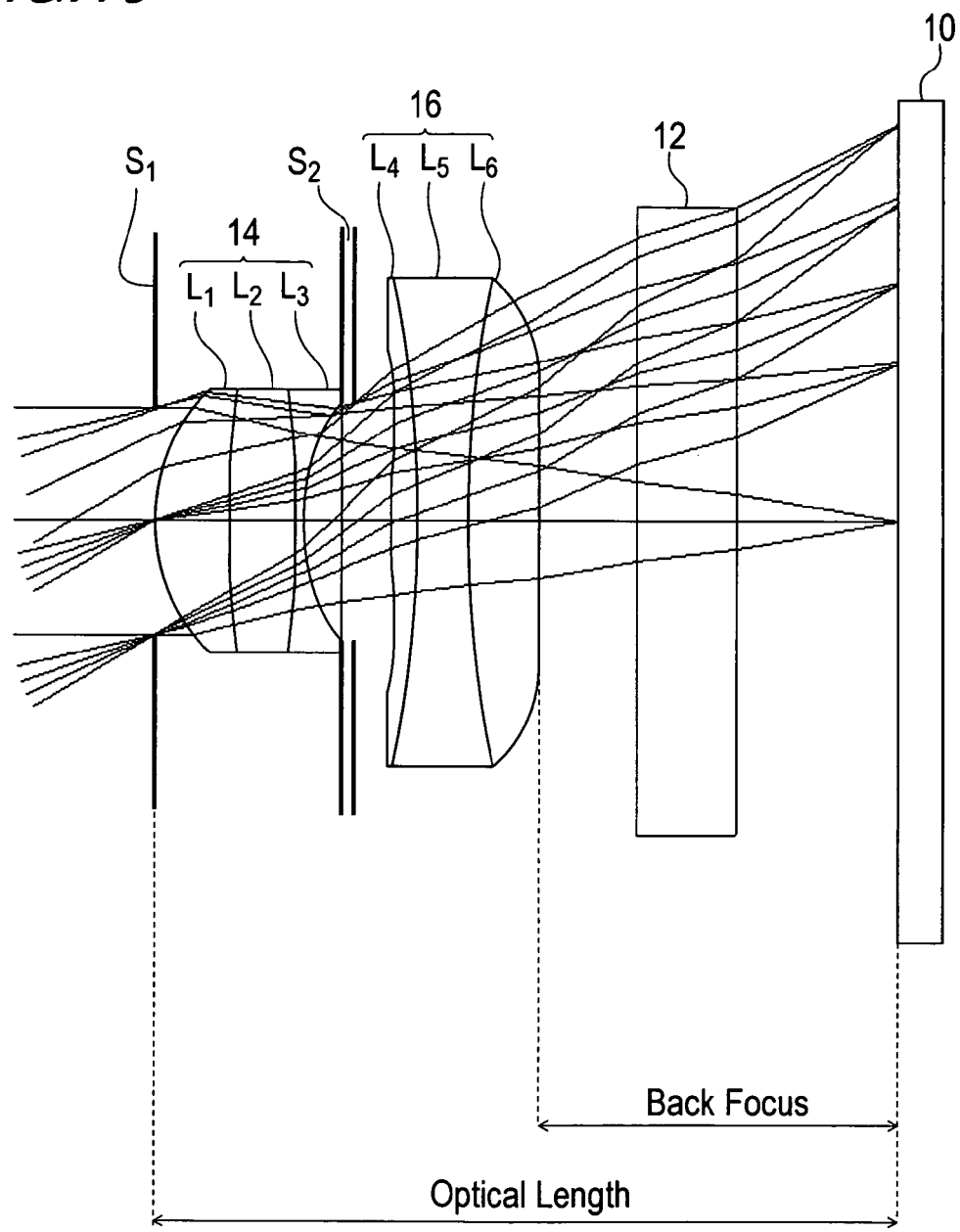
FIG. 10 is a cross-sectional view depicting an imaging lens according to Embodiment 3.

FIG. 10 is a cross-sectional view of the imaging lens of Embodiment 3. As FIG. 10 shows, the first diaphragm $S_1$ to play a role of an aperture diaphragm is formed at a position of an intersection of the first surface (surface at the object side) of the first lens $L_1$ constituting the first junction type compound lens 14 and the optical axis. The second diaphragm $S_2$ to play a role of preventing a flare or smear is formed between the first junction type compound lens 14 and the second junction type compound lens 16.

The diaphragm surface of the first diaphragm $S_1$ is a plane, so $r_1=\infty$ is indicated in Table 3. The second diaphragm $S_2$ is comprised of a plane $r_6$ and $r_7$, so $r_6=\infty$ and $r_7=\infty$ are indicated in Table 3. The F number Fno is 2.9.

As Table 3 shows, $r_3$ is a positive value and $r_4$ is a negative value, so the second lens $L_2$ is a biconvex lens, and $r_9$ is a negative value and $r_{10}$ is a positive value, so the fifth lens $L_5$ is a biconcave lens. $r_2$ is a positive value and $r_5$ is a positive value, so the first lens $L_1$ is a lens where the object side face of this first lens $L_1$ is a convex surface facing the object side on a paraxial line, and the third lens $L_3$ is a lens where the image side face of this third lens $L_3$ is a concave surface facing the image side on a paraxial line. $r_8$ is a positive value and $r_{11}$ is a positive value, so the fourth lens. $L_4$ is a lens where the object side face of this fourth lens $L_4$ is a convex surface facing the object side on a paraxial line, and the sixth lens $L_6$ is a lens where the image side face of this sixth lens $L_6$ is a concave surface facing the image side on a paraxial line.

In Embodiment 3, the optical length L with respect to the focal distance f=1.00 mm is 1.111 mm, and the back focus bf is 0.489 mm.

Figure 11:
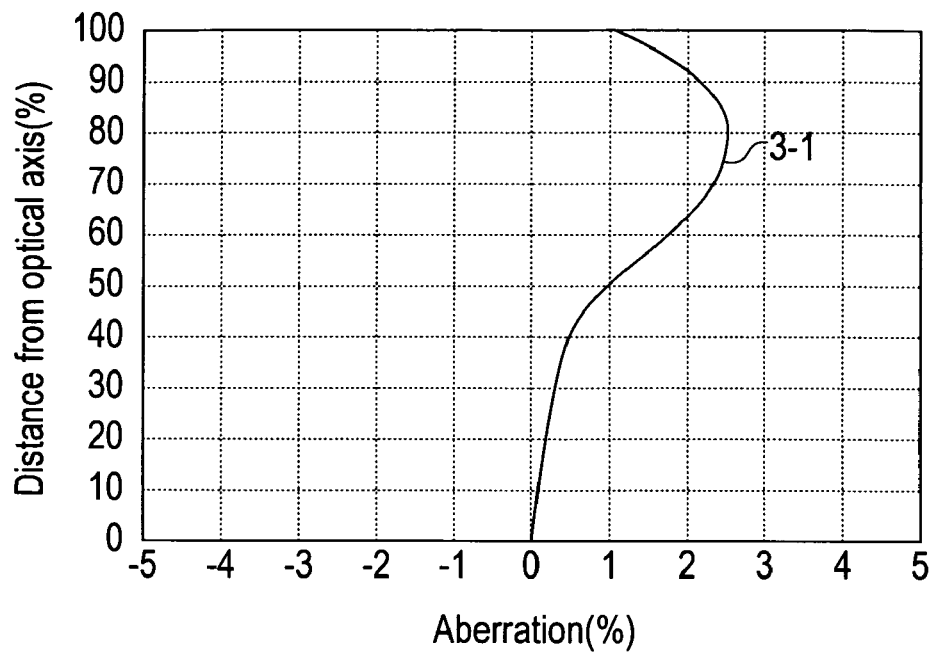
FIG. 11 is a diagram depicting the distortion aberration of the imaging lens of Embodiment 3.
Figure 12:
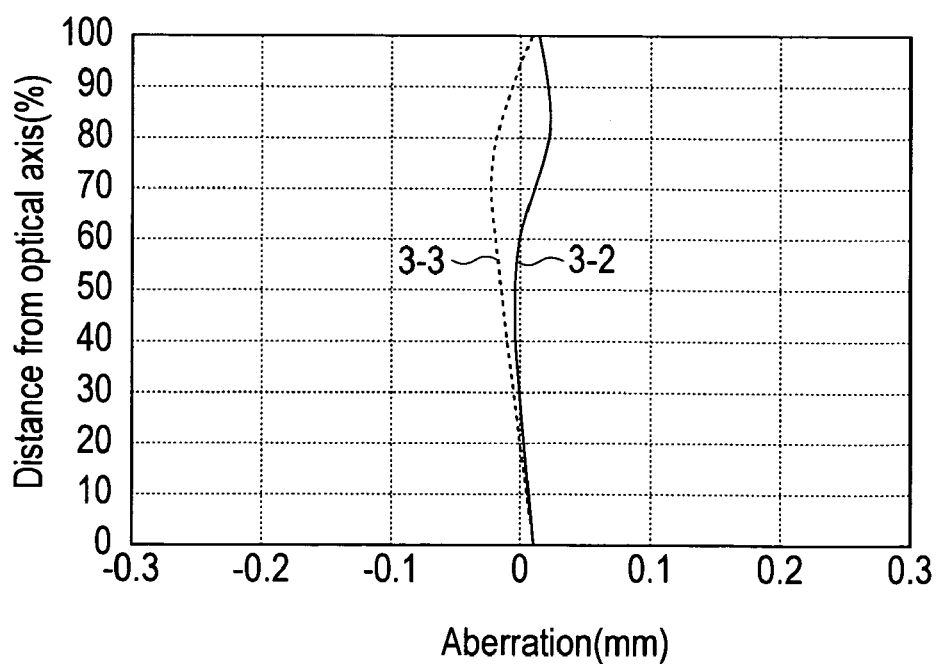
FIG. 12 is a diagram depicting the astigmatism aberration of the imaging lens of Embodiment 3.
Figure 13:
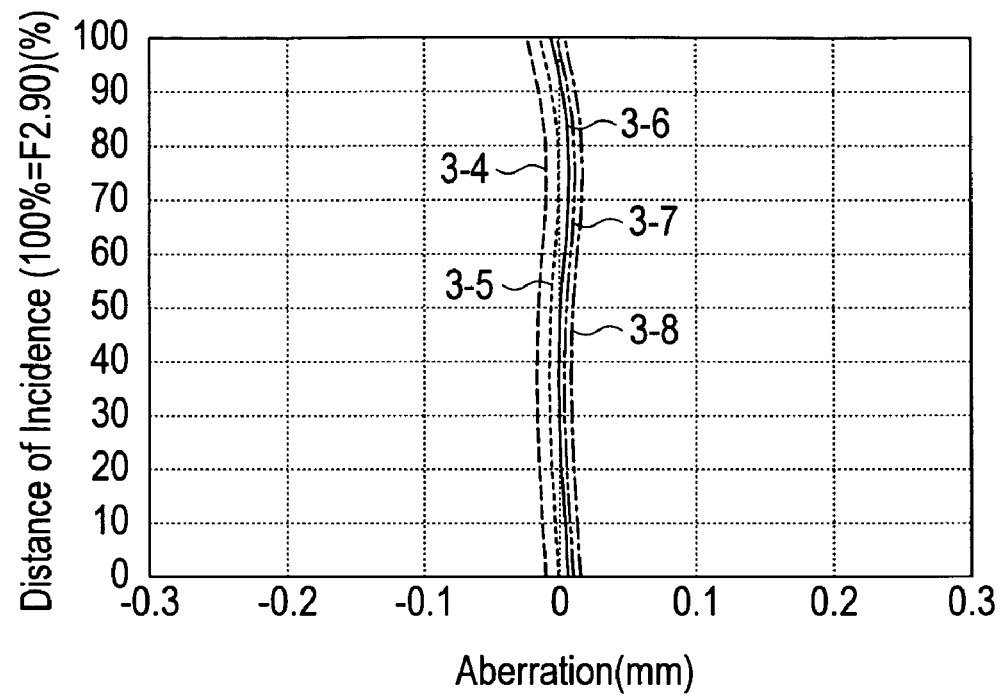
FIG. 13 is a diagram depicting the chromatic/spherical aberration of the imaging lens of Embodiment 3.

FIG. 11 shows a graph of the distortion aberration curve 3-1, FIG. 12 shows a graph of the astigmatism aberration curve (aberration curve 3-2 on the meridional surface and aberration curve 3-3 on the sagittal surface), and FIG. 13 shows a graph of a chromatic/spherical aberration curve (aberration curve 3-4 on g-line, aberration curve 3-5 on F-line, aberration curve 3-6 on e-line, aberration curve 3-7 on d-line and aberration curve 3-8 on C-line).

The ordinates of the aberration curves in FIG. 11 and FIG. 12 show the image height by a % of the distance from the optical axis. In FIG. 11 and FIG. 12, 100% corresponds to 0.600 mm. The ordinate of the aberration curve in FIG. 13 shows the entrance height h (F number), and the maximum thereof corresponds to 2.9. The abscissa of FIG. 11 shows the aberration (%), and the abscissa of FIG. 12 and FIG. 13 show the value of the aberration (mm).

For the distortion aberration, the absolute value of the aberration is 2.5%, which is the maximum, at the position of 80% image height (image height: 0.480 mm), and the absolute value of the aberration is within 2.5% in a range where the image height is 0.600 mm or less.

For the astigmatism aberration, the absolute value of the aberration on the meridional surface is 0.0217 mm, which is the maximum, at the position of 80% image height (image height: 0.480 mm), and the absolute value of the aberration is within 0.0217 mm in a range where the image height is 0.600 mm or less.

For the chromatic/spherical aberration, the absolute value of the aberration curve 3-4 on the g-line is 0.0239 mm, which is the maximum at the 100% entrance height h, and the absolute value of the aberration is within 0.0239 mm.

Therefore according to the imaging lens of Embodiment 3, the optical length can be short enough to be installed in a portable telephone or the like, the back focus can be long enough to insert such components as a filter and cover glass between the imaging lens and the imaging plane, and good images can be acquired.

Embodiment 4

In the lens system of Embodiment 4, the first lens $L_1$ and the third lens $L_3$ of the first junction type compound lens are formed of transparent curable silicone resin SIAM-7852 (made by Fuji Polymer Industries Co., Ltd.), and the second lens $L_2$ is formed of optical glass BK7 (made by Ohara Inc.). The fourth lens $L_4$ and the sixth lens $L_6$ of the second junction type compound lens are formed of transparent curable silicone resin SMX-7852 (made by Fuji Polymer Industries Co., Ltd.) and the fifth lens $L_5$ is formed of optical glass BK7 (made by Ohara Inc.).

(A) The refractive index $N_2$ of the first lens $L_1$ is $N_2$=1.51000.
(B) The refractive index $N_3$ of the second lens $L_2$ is $N_3$=1.51680.
(C) The refractive index $N_4$ of the third lens $L_3$ is $N_4$=1.51000.
(D) The Abbe number $v_2$ of the first lens $L_1$ is $v_2$=56.0.
(E) The Abbe number $v_3$ of the second lens $L_2$ is $v_3$=61.0.
(F) The Abbe number $v_4$ of the third lens $L_3$ is $v_4$=56.0.
(G) The refractive index $N_8$ of the fourth lens $L_4$ is $N_8$=1.51000.
(H) The refractive index $N_9$ of the fifth lens $L_5$ is $N_9$=1.51680.
(I) The refractive index $N_{10}$ of the sixth lens $L_6$ is $N_{10}$=1.51000.
(J) The Abbe number $v_8$ of the fourth lens $L_4$ is $v_8$=56.0.
(K) The Abbe number $v_9$ of the fifth lens $L_5$ is $v_9$=61.0.
(L) The Abbe number $v_{10}$ of the sixth lens $L_6$ is $v_{10}$=56.0.

Therefore $|N_3-N_2|=|N_3-N_4|=|N_9-N_8|=|N_9-N_{10}|=0.00680$, which satisfies the following Conditions (1), (2), (5) and (6). Also $|v_3-v_2|=|v_3-v_4|=|v_9-v_8|=|v_9-v_{10}|=5.0$, which satisfies the following Conditions (3), (4), (7) and (8).

Figure 14:
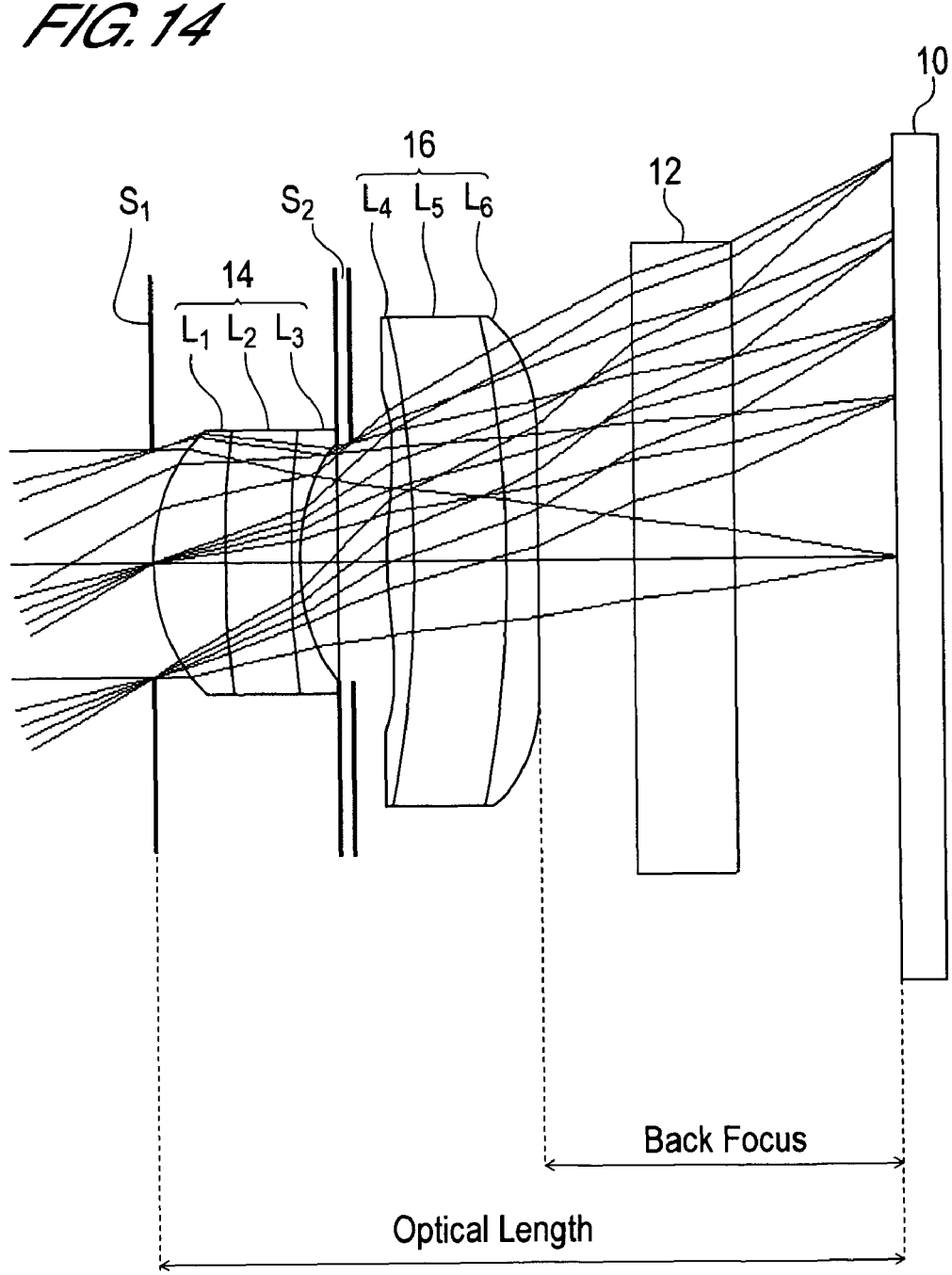
FIG. 14 is a cross-sectional view depicting an imaging lens according to Embodiment 4.

FIG. 14 is a cross-sectional view of the imaging lens of Embodiment 4. As FIG. 14 shows, the first diaphragm $S_1$ to play a role of an aperture diaphragm is formed at a position of an intersection of the first surface (surface at the object side) of the first lens $L_1$ constituting the first junction type compound lens 14 and the optical axis. The second diaphragm $S_2$ to play a role of preventing a flare or smear is formed between the first junction type compound lens 14 and the second junction type compound lens 16.

The diaphragm surface of the first diaphragm $S_1$ is a plane, so $r_1=\infty$ is indicated in Table 4. The second diaphragm $S_2$ is comprised of planes $r_6$ and $r_7$, so $r_6=\infty$ and $r_7=\infty$ are indicated in Table 4. The F number Fno is 2.9.

As Table 4 shows, $r_3$ is a positive value and $r_4$ is also a positive value, so the second lens $L_2$ is a meniscus lens of which convex surface is facing the object side, and $r_9$ is a negative value and $r_{10}$ is also a negative value, so the fifth lens $L_5$ is a meniscus lens of which convex surface is facing the image side. $r_2$ is a positive value and $r_5$ is also a positive value, so the first lens $L_1$ is a lens where the object side face of this first lens $L_1$ is a convex surface facing the object side on a paraxial line, and the third lens $L_3$ is a lens where the image side face of this third lens $L_3$ is a concave surface facing the image side on a paraxial line. $r_8$ is a positive value and $r_{11}$ is also a positive value, so the fourth lens $L_4$ is a lens where the object side face of this fourth lens $L_4$ is a convex surface facing the object side on a paraxial line, and the sixth lens $L_6$ is a lens where the image side face of this sixth lens $L_6$ is a concave surface facing the image side on a paraxial line.

In Embodiment 4, the optical length L with respect to the focal distance f=1.00 mm is 1.109 mm, and the back focus bf is 0.488 mm.

Figure 15:
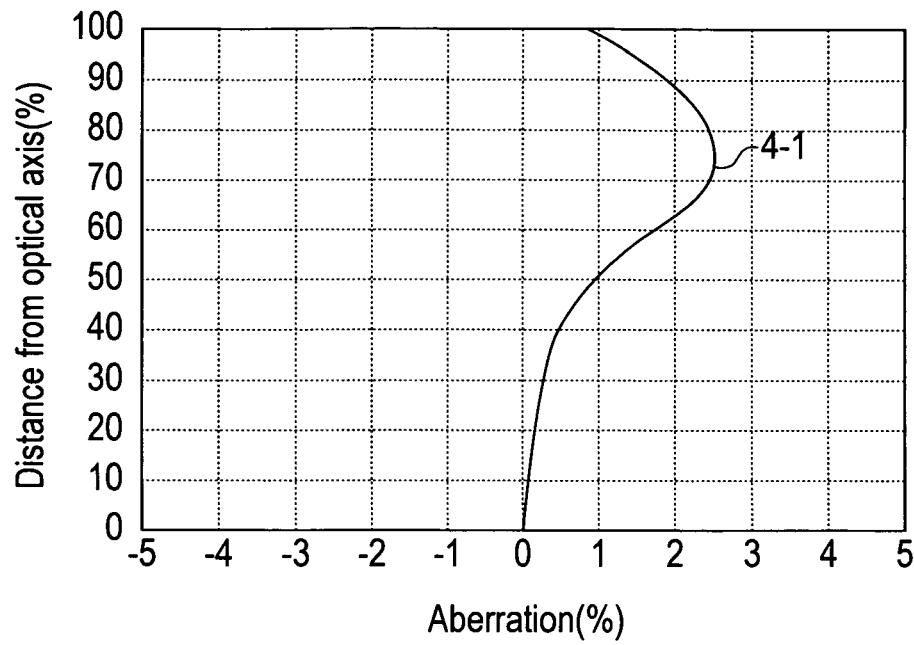
FIG. 15 is a diagram depicting the distortion aberration of the imaging lens of Embodiment 4.
Figure 16:
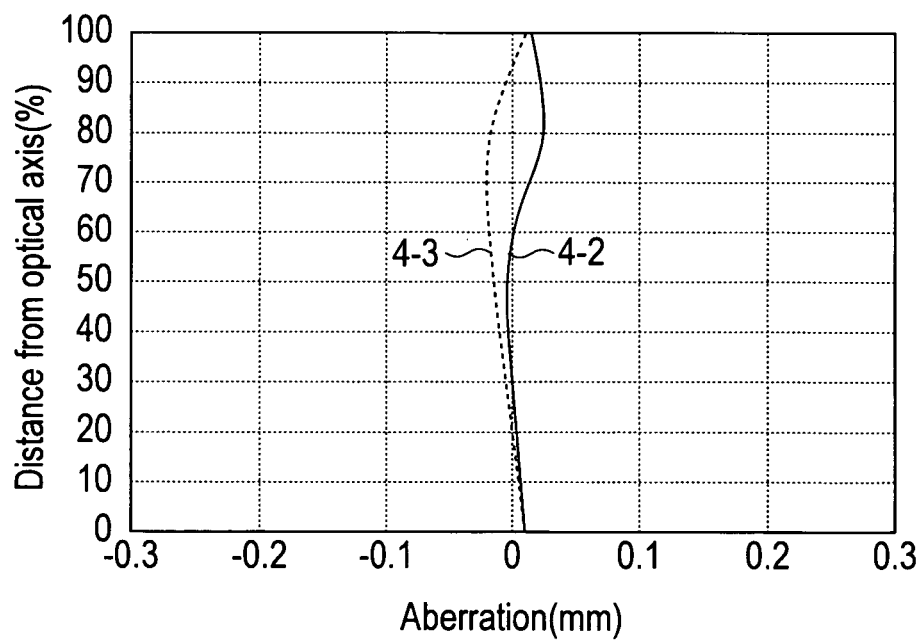
FIG. 16 is a diagram depicting the astigmatism aberration of the imaging lens of Embodiment 4.
Figure 17:
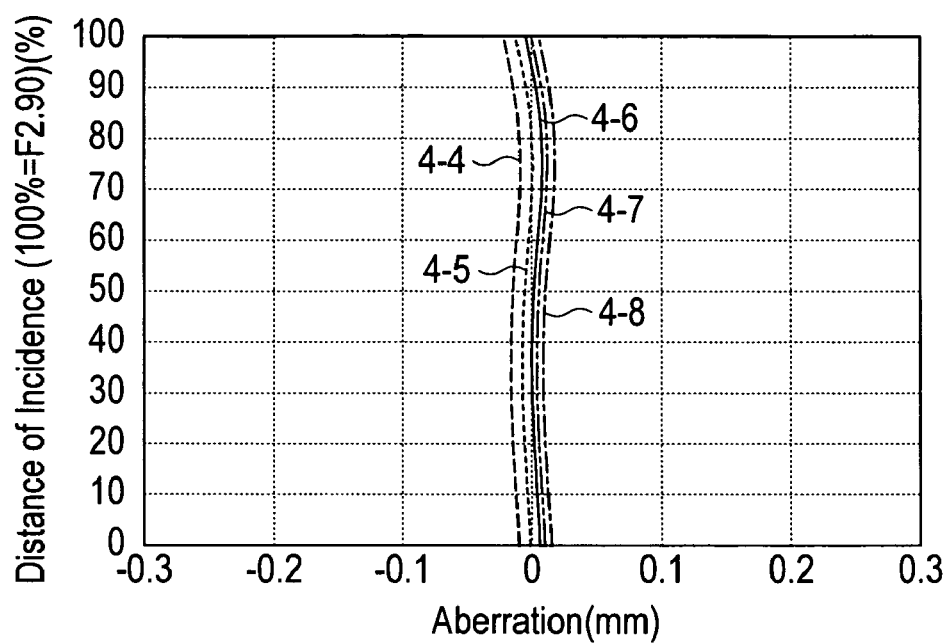
FIG. 17 is a diagram depicting the chromatic/spherical aberration of the imaging lens of Embodiment 4.

FIG. 15 shows a graph of the distortion aberration curve 4-1, FIG. 16 shows a graph of the astigmatism aberration curve (aberration curve 4-2 on the meridional surface and aberration curve 4-3 on the sagittal surface), and FIG. 17 shows a graph of a chromatic/spherical aberration curve (aberration curve 4-4 on g-line, aberration curve 4-5 on F-line, aberration curve 4-6 on e-line, aberration curve 4-7 on d-line and aberration curve 4-8 on C-line).

The ordinates of the aberration curves in FIG. 15 and FIG. 16 show the image height by a % of the distance from the optical axis. In FIG. 15 and FIG. 16, 100% corresponds to 0.600 mm. The ordinate of the aberration curve in FIG. 17 shows the entrance height h (F number), and the maximum thereof corresponds to 2.9. The abscissa of FIG. 15 shows the aberration (%), and the abscissa of FIG. 16 and FIG. 17 show the value of the aberration (mm).

For the distortion aberration, the absolute value of the aberration is 2.5%, which is the maximum, at the position of 75% image height (image height: 0.450 mm), and the absolute value of the aberration is within 2.5% in a range where the image height is 0.600 mm or less.

For the astigmatism aberration, the absolute value of the aberration on the meridional surface is 0.0242 mm, which is the maximum, at the position of 80% image height (image height: 0.480 mm), and the absolute value of the aberration is within 0.0242 mm in a range where the image height is 0.600 mm or less.

For the chromatic/spherical aberration, the absolute value of the aberration curve 4-4 on the g-line is 0.0219 mm, which is the maximum at the 100% entrance height h, and the absolute value of the aberration is within 0.0219 mm.

Therefore according to the imaging lens of Embodiment 4, the optical length can be short enough to be installed in a portable telephone or the like, the back focus can be long enough to insert such components as a filter and cover glass between the imaging lens and the imaging plane, and good images can be acquired.

Embodiment 5

In the lens system of Embodiment 5, the first lens $L_1$ and the third lens $L_3$ of the first junction type compound lens are formed of transparent curable silicone resin SMX-7852 (made by Fuji Polymer Industries Co., Ltd.), and the second lens $L_2$ is formed of optical glass BK7 (made by Ohara Inc.). The fourth lens $L_4$ and the sixth lens $L_6$ of the second junction type compound lens are formed of a transparent curable silicone resin SMX-7852 (made by Fuji Polymer Industries Co., Ltd.), and the fifth lens $L_5$ is formed of optical glass BK7 (made by Ohara Inc.).

(A) The refractive index $N_2$ of the first lens $L_1$ is $N_2$=1.51000.
(B) The refractive index $N_3$ of the second lens $L_2$ is $N_3$=1.51680.
(C) The refractive index $N_4$ of the third lens $L_3$ is $N_4$=1.51000.
(D) The Abbe number $v_2$ of the first lens $L_1$ is $v_2$=56.0.
(E) The Abbe number $v_3$ of the second lens $L_2$ is $v_3$=61.0.
(F) The Abbe number $v_4$ of the third lens $L_3$ is $v_4$=56.0.
(G) The refractive index $N_8$ of the fourth lens $L_4$ is $N_8$=1.51000.
(H) The refractive index $N_9$ of the fifth lens $L_5$ is $N_9$=1.51680.
(I) The refractive index $N_{10}$ of the sixth lens $L_6$ is $N_{10}$=1.51000.
(J) The Abbe number $v_8$ of the fourth lens $L_4$ is $v_8$=56.0.
(K) The Abbe number $v_9$ of the fifth lens $L_5$ is $v_9$=61.0.
(L) The Abbe number $v_{10}$ of the sixth lens $L_6$ is $v_{10}$=56.0.

Therefore $|N_3-N_2|=|N_3-N_4|=|N_9-N_8|=|N_9-N_{10}|=0.00680$, which satisfies the following Conditions (1), (2), (5) and (6). Also $|v_3-v_2|=|v_3-v_4|=|v_9-v_8|=|v_9-v_{10}|=5.0$, which satisfies the following Conditions (3), (4), (7) and (8).

Figure 18:
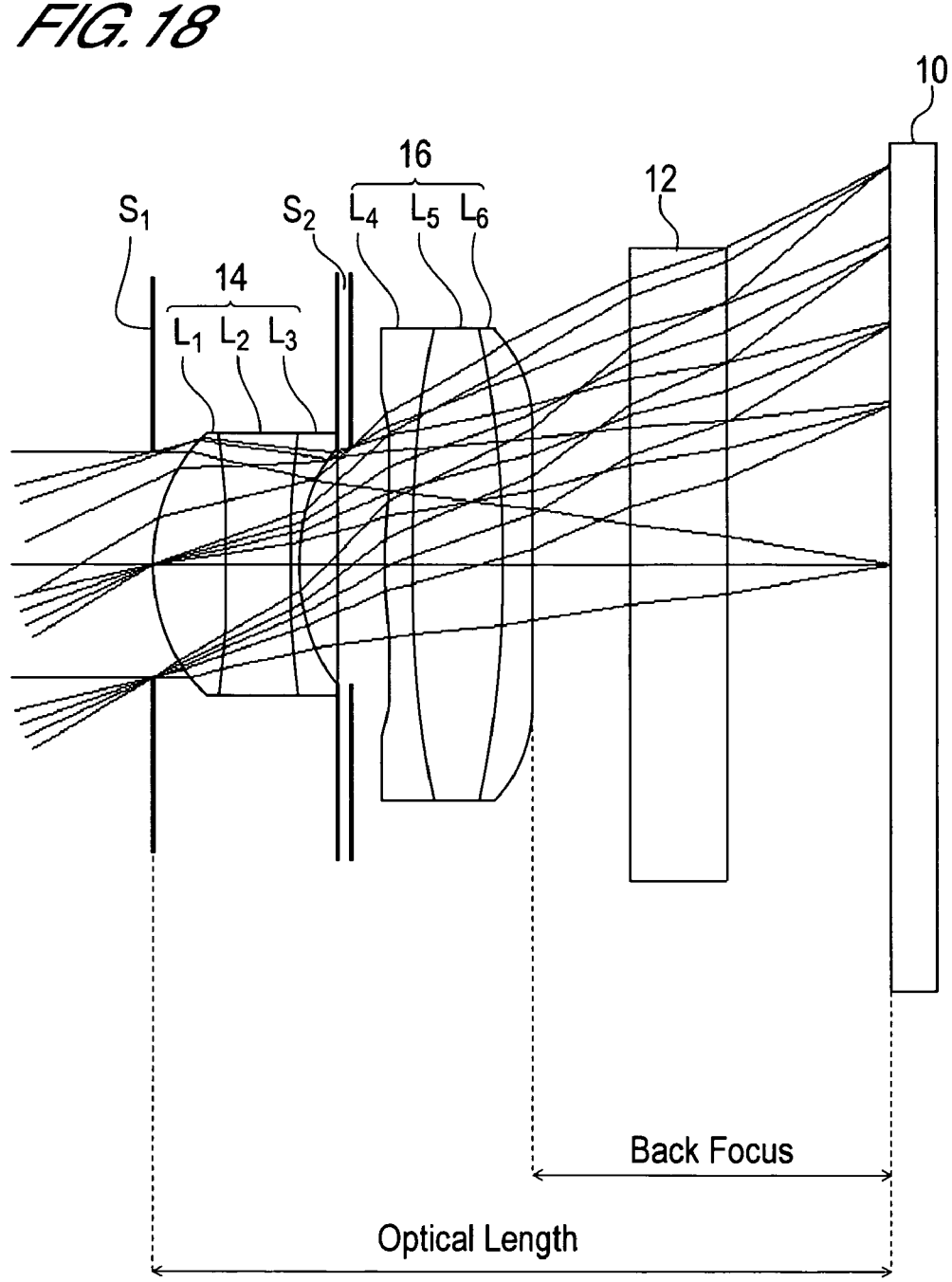
FIG. 18 is a cross-sectional view depicting an imaging lens according to Embodiment 5.

FIG. 18 is a cross-sectional view of the imaging lens of Embodiment 5. As FIG. 18 shows, the first diaphragm $S_1$ to play a role of an aperture diaphragm is formed at a position of an intersection of the first surface (surface at the object side) of the first lens $L_1$ constituting the first junction type compound lens 14 and the optical axis. The second diaphragm $S_2$ to play a role of preventing a flare or smear is formed between the first junction type compound lens 14 and the second junction type compound lens 16.

The diaphragm surface of the first diaphragm $S_1$ is a plane, so $r_1=\infty$ is indicated in Table 5. The second diaphragm $S_2$ is comprised of planes $r_6$ and $r_7$, so $r_6=\infty$ and $r_7=\infty$ are indicated in Table 5. The F number Fno is 2.9.

As Table 5 shows, $r_3$ is a negative value and $r_4$ is a positive value, so the second lens $L_2$ is a biconcave lens, and $r_9$ is a positive value and $r_{10}$ is a negative value, so the fifth lens $L_5$ is a biconvex lens. $r_2$ is a positive value and $r_5$ is also a positive value, so the first lens $L_1$ is a lens where the object side face of the first lens $L_1$ is a convex surface facing the object side on a paraxial line, and the third lens $L_3$ is a lens where the image side face of this third lens $L_3$ is a concave surface facing the image side on a paraxial line. $r_8$ is a positive value and $r_{11}$ is a positive value, so the fourth lens $L_4$ is a lens where the object side face of this fourth lens $L_4$ is a convex surface facing the object side on a paraxial line, and the sixth lens $L_6$ is a lens where the image side face of this sixth lens $L_6$ is a concave surface facing the image side on a paraxial line.

In Embodiment 5, the optical length L with respect to the focal distance f=1.00 mm is 1.110 mm, and the back focus bf is 0.490 mm.

Figure 19:
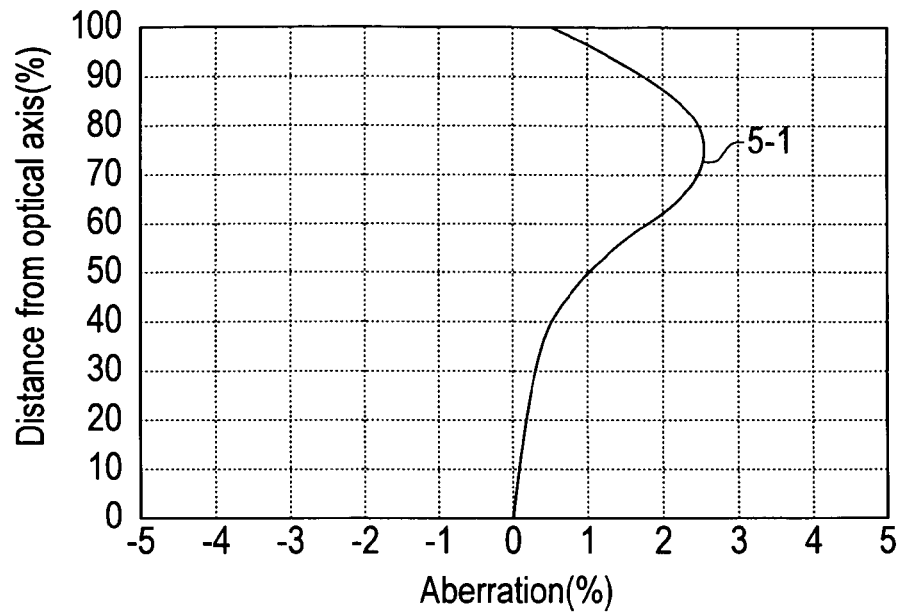
FIG. 19 is a diagram depicting the distortion aberration of the imaging lens of Embodiment 5.
Figure 20:
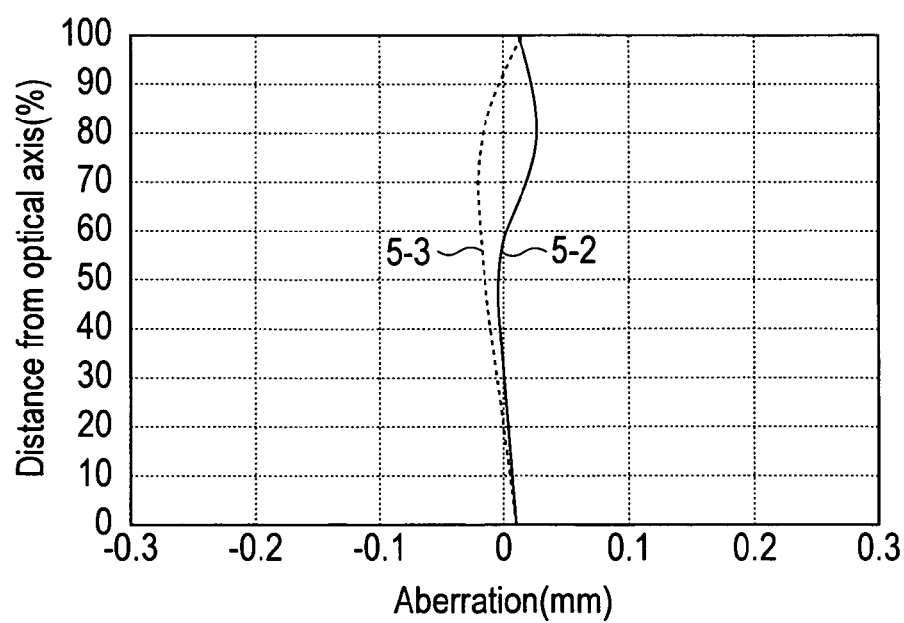
FIG. 20 is a diagram depicting the astigmatism aberration of the imaging lens of Embodiment 5.
Figure 21:
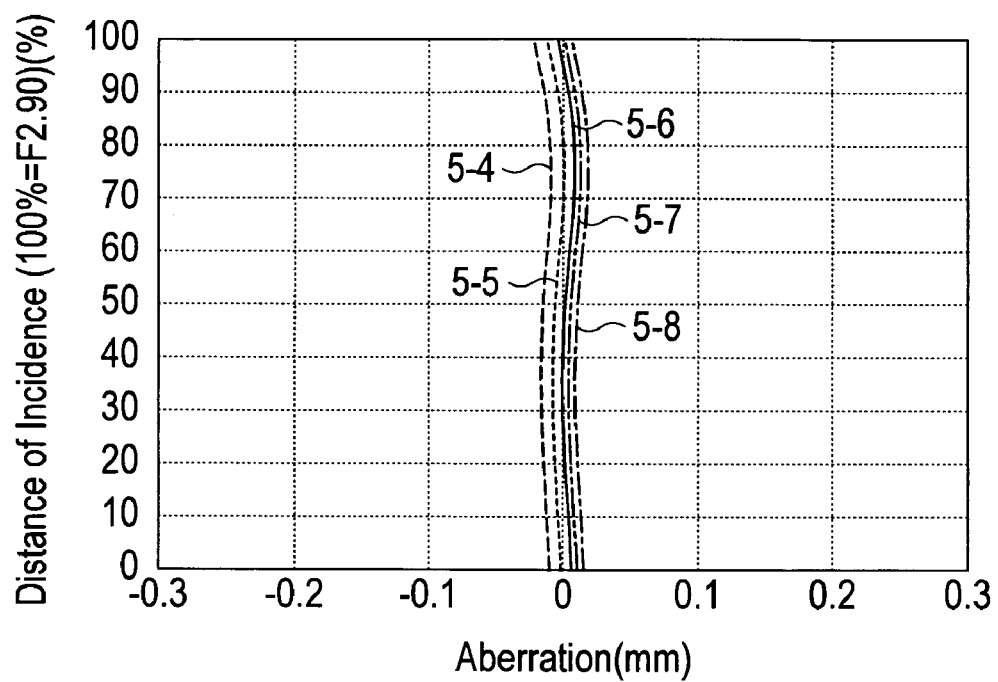
FIG. 21 is a diagram depicting the chromatic/spherical aberration of the imaging lens of Embodiment 5.

FIG. 19 shows a graph of the distortion aberration curve 5-1, FIG. 20 shows a graph of the astigmatism aberration curve (aberration curve 5-2 on the meridional surface and aberration curve 5-3 on the sagittal surface), and FIG. 21 shows a graph of a chromatic/spherical aberration curve (aberration curve 5-4 on g-line, aberration curve 5-5 on F-line, aberration curve 5-6 on e-line, aberration curve 5-7 on d-line and aberration curve 5-8 on C-line).

The ordinates of the aberration curves in FIG. 19 and FIG. 20 show the image height by a % of the distance from the optical axis. In FIG. 19 and FIG. 20, 100% corresponds to 0.609 mm. The ordinate of the aberration curve in FIG. 21 shows the entrance height h (F number), and the maximum thereof corresponds to 2.9. The abscissa of FIG. 19 shows the aberration (%), and the abscissa of FIG. 20 and FIG. 21 show the value of the aberration (mm).

For the distortion aberration, the absolute value of the aberration is 2.5%, which is the maximum, at the position of 75% image height (image height: 0.457 mm), and the absolute value of the aberration is within 2.5% in a range where the image height is 0.609 mm or less.

For the astigmatism aberration, the absolute value of the aberration on the meridional surface is 0.0267 mm, which is the maximum, at the position of 80% image height (image height: 0.488 mm), and the absolute value of the aberration is within 0.0267 mm in a range where the image height is 0.609 mm or less.

For the chromatic/spherical aberration, the absolute value of the aberration curve 5-4 on the g-line is 0.0224 mm, which is the maximum at the 100% entrance height h, and the absolute value of the aberration is within 0.0224 mm.

Therefore according to the imaging lens of Embodiment 5, the optical length can be short enough to be installed in a portable telephone or the like, the back focus can be long enough to insert such components as a filter and cover glass between the imaging lens and the imaging plane, and good images can be acquired.

Embodiment 6

In the lens system of Embodiment 6, the first lens $L_1$ and the third lens $L_3$ of the first junction type compound lens are formed of transparent curable silicone resin SMX-7852 (made by Fuji Polymer Industries Co., Ltd.), and the second lens $L_2$ is formed of low thermal expansion type transparent high hardness silicone resin Silplus MHD (made by Nippon Steel Chemical Co., Ltd.). The fourth lens $L_4$ and the sixth lens $L_6$ of the second junction type compound lens are formed of transparent curable silicone resin SMX-7852 (made by Fuji Polymer Industries Co., Ltd.), and the fifth lens $L_5$ is formed of low thermal expansion type transparent high hardness silicone resin Silplus MHD (made by Nippon Steel Chemical Co., Ltd.).
(A) The refractive index $N_2$ of the first lens $L_1$ is $N_2$=1.51000.
(B) The refractive index $N_3$ of the second lens $L_2$ is $N_3$=1.51100.
(C) The refractive index $N_4$ of the third lens $L_3$ is $N_4$=1.51000.
(D) The Abbe number $v_2$ of the first lens $L_1$ is $v_2$=56.0.
(E) The Abbe number $v_3$ of the second lens $L_2$ is $v_3$=36.0.
(F) The Abbe number $v_4$ of the third lens $L_3$ is $v_4$=56.0.
(G) The refractive index $N_8$ of the fourth lens $L_4$ is $N_8$=1.51000.
(H) The refractive index $N_9$ of the fifth lens $L_5$ is $N_9$=1.51100.
(I) The refractive index $N_{10}$ of the sixth lens $L_6$ is $N_{10}$=1.51000.
(J) The Abbe number $v_8$ of the fourth lens $L_4$ is $v_8$=56.0.
(K) The Abbe number $v_9$ of the fifth lens $L_5$ is $v_9$=36.0.
(L) The Abbe number $v_{10}$ of the sixth lens $L_6$ is $v_{10}$=56.0.

Therefore $|N_3-N_2|=|N_3-N_4|=|N_9-N_8|=|N_9-N_{10}|$=0.000100, which satisfies the following Conditions (1), (2), (5) and (6). Also $|v_3-v_2|=|v_3-v_4|=|v_9-v_8|=|v_9-v_{10}|$=20.0, which satisfies the following Conditions (3), (4), (7) and (8).

Figure 22:
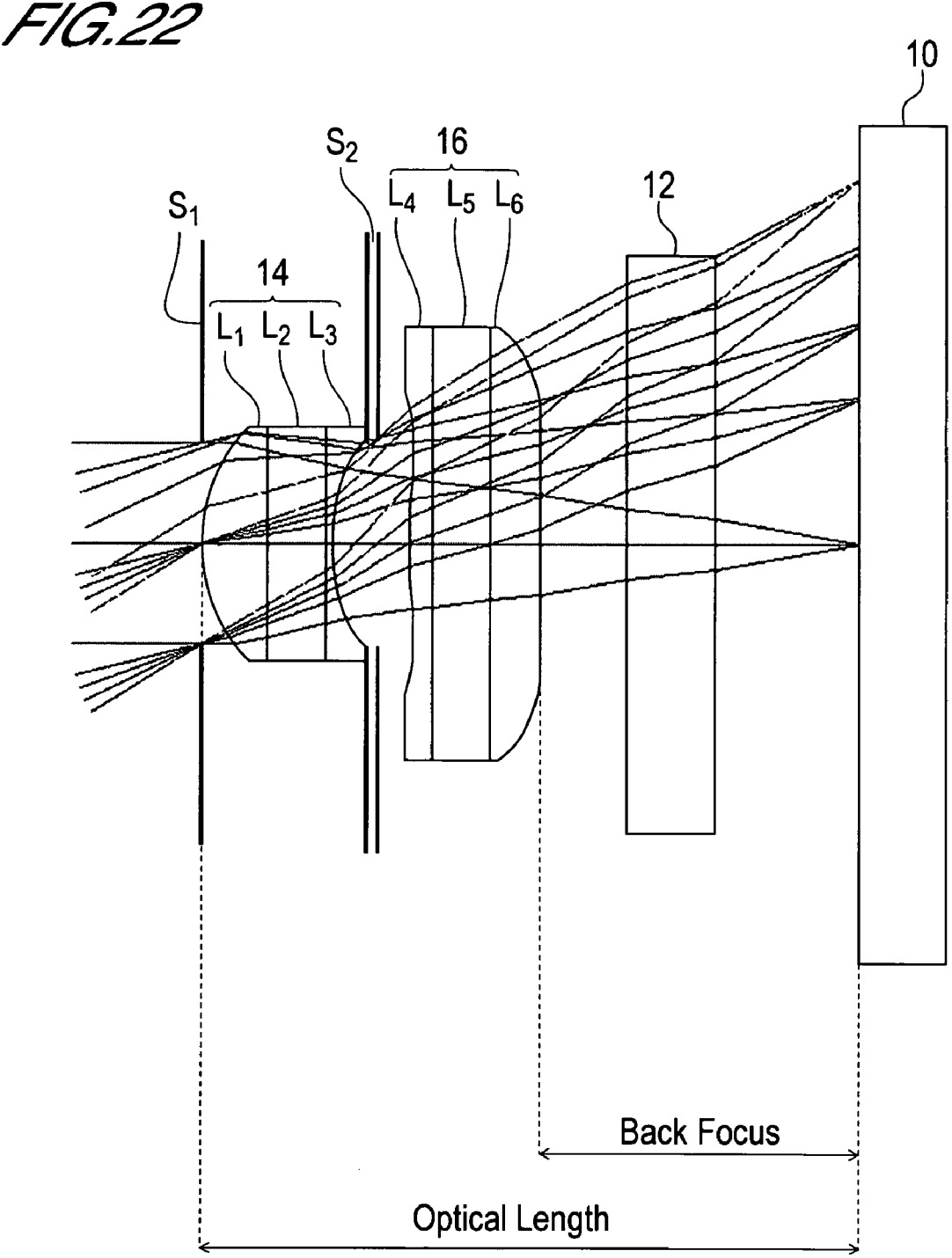
FIG. 22 is a cross-sectional view depicting an imaging lens according to Embodiment 6.

FIG. 22 is a cross-sectional view of the imaging lens of Embodiment 6. As FIG. 22 shows, the first diaphragm $S_1$ to play a role of an aperture diaphragm is formed at a position of an intersection of the first surface (surface at the object side) of the first lens $L_1$ constituting the first junction type compound lens 14 and the optical axis. The second diaphragm $S_2$ to play a role of preventing a flare or smear is formed between the first junction type compound lens 14 and the second junction type compound lens 16.

The diaphragm surface of the first diaphragm $S_1$ is a plane, so $r_1$=∞ is indicated in Table 6. The second diaphragm $S_2$ is comprised of a plane $r_6$ and $r_7$, so $r_6$=∞ and $r_7$=∞ are indicated in Table 6. The F number Fno is 2.9.

As Table 6 shows, $r_3$=∞ and $r_4$=∞, so the second lens $L_2$ is an optical-parallel plate, and $r_9$=∞ and $r_{10}$=∞, so the fifth lens $L_5$ is an optical-parallel plate. $r_2$ is a positive value and $r_5$ is a positive value, so the first lens $L_1$ is a plano-convex lens where the object side face of this first lens $L_1$ is a convex surface facing the object side on a paraxial line, and the third lens $L_3$ is a plano-concave lens where the image side face of this third lens $L_3$ is a concave surface facing the image side on a paraxial line. $r_8$ is a positive value and $r_{11}$ is also a positive value, so the fourth lens $L_4$ is a plano-convex lens where the object side face of this fourth lens $L_4$ is a convex surface facing the object side on a paraxial line, and the sixth lens $L_6$ is a plano-concave lens where the image side face of this sixth lens $L_6$ is a concave surface facing the image side on a paraxial line.

In Embodiment 6, the optical length L with respect to the focal distance f=1.00 mm is 1.112 mm, and the back focus bf is 0.491 mm.

Figure 23:
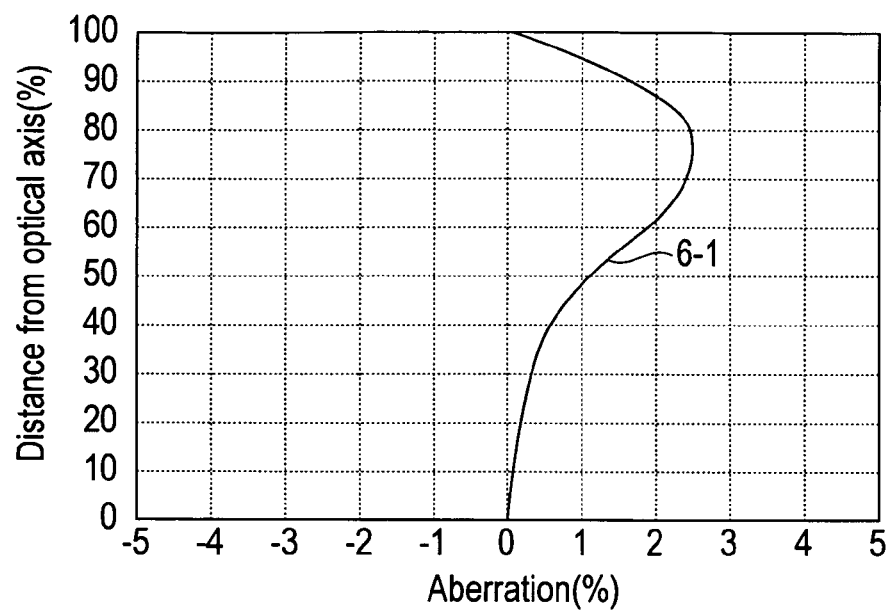
FIG. 23 is a diagram depicting the distortion aberration of the imaging lens of Embodiment 6.
Figure 24:
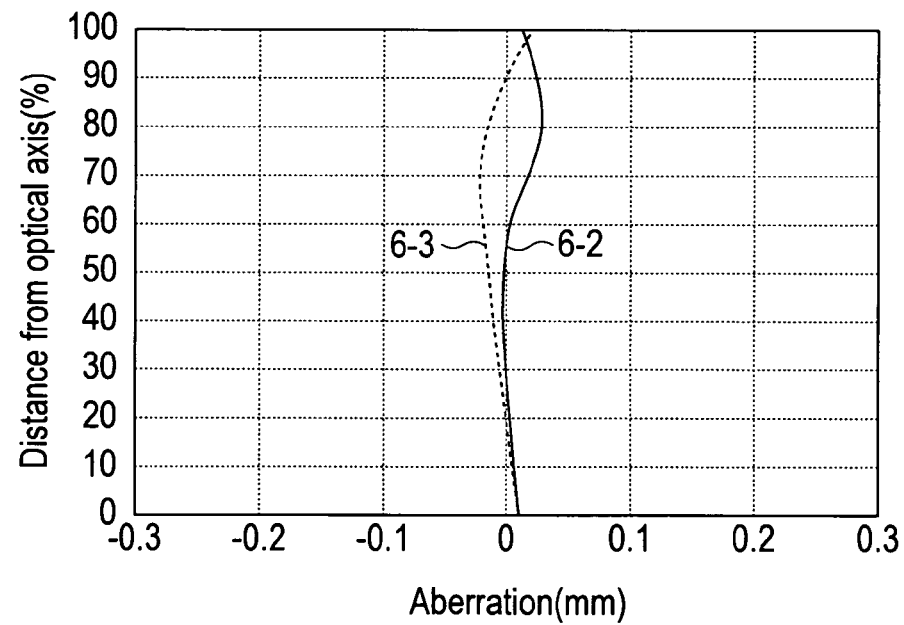
FIG. 24 is a diagram depicting the astigmatism aberration of the imaging lens of Embodiment 6.
Figure 25:
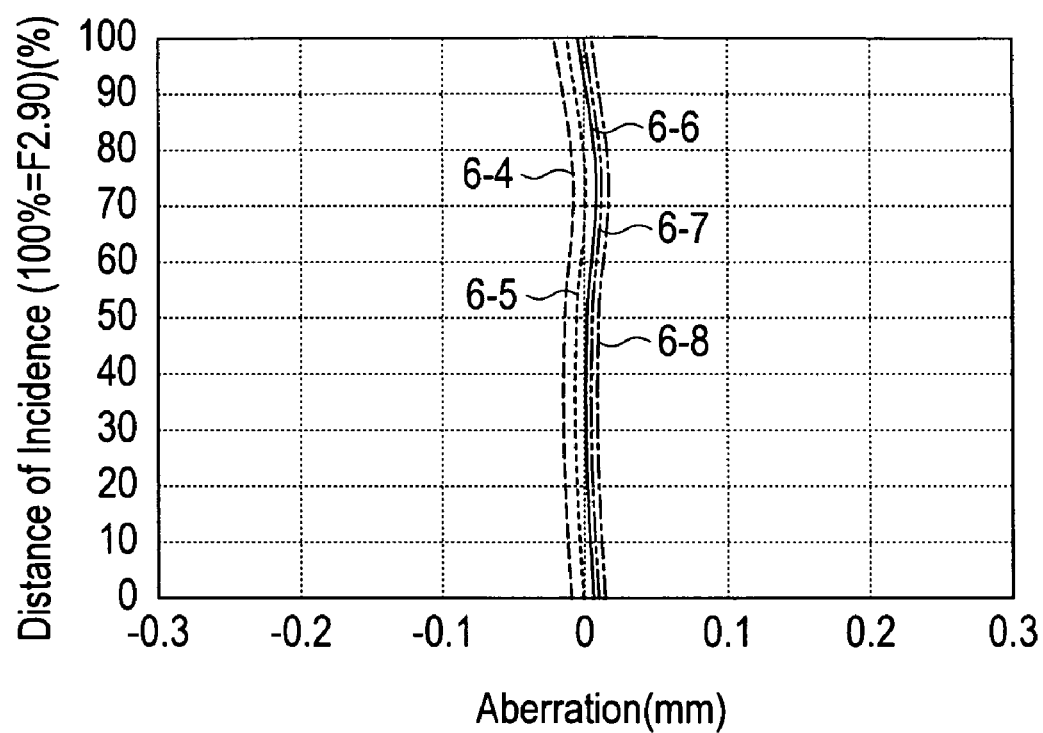
FIG. 25 is a diagram depicting the chromatic/spherical aberration of the imaging lens of Embodiment 6.

FIG. 23 shows a graph of the distortion aberration curve 6-1, FIG. 24 shows a graph of the astigmatism aberration curve (aberration curve 6-2 on the meridional surface and aberration curve 6-3 on the sagittal surface), and FIG. 25 shows a graph of a chromatic/spherical aberration curve (aberration curve 6-4 on g-line, aberration curve 6-5 on F-line, aberration curve 6-6 on e-line, aberration curve 6-7 on d-line and aberration curve 6-8 on C-line).

The ordinates of the aberration curves in FIG. 23 and FIG. 24 show the image height by a % of the distance from the optical axis. In FIG. 23 and FIG. 24, 100% corresponds to 0.623 mm. The ordinate of the aberration curve in FIG. 25 shows the entrance height h (F number), and the maximum thereof corresponds to 2.9. The abscissa of FIG. 23 shows the aberration (%), and the abscissa of FIG. 24 and FIG. 25 show the value of the aberration (mm).

For the distortion aberration, the absolute value of the aberration is 2.5%, which is the maximum, at the position of 80% image height (image height: 0.498 mm), and the absolute value of the aberration is within 2.5% in a range where the image height is 0.623 mm or less.

For the astigmatism aberration, the absolute value of the aberration on the meridional surface is 0.0280 mm, which is the maximum, at the position of 80% image height (image height: 0.498 mm), and the absolute value of the aberration is within 0.0280 mm in a range where the image height is 0.623 mm or less.

For the chromatic/spherical aberration, the absolute value of the aberration curve 6-4 on the g-line is 0.0212 mm, which is the maximum at the 100% entrance height h, and the absolute value of the aberration is within 0.0212 mm.

Therefore according to the imaging lens of Embodiment 6, the optical length can be short enough to be installed in a portable telephone or the like, the back focus can be long enough to insert such components as a filter and cover glass between the imaging lens and the imaging plane, and good images can be acquired.

The difference of the imaging lens of Embodiment 6 from the imaging lens of the above mentioned Embodiments 1 to 5 is that the second lens $L_2$ and the fifth lens $L_5$ are formed of a curable resin material, which is transparent high hardness silicone resin. The first junction type compound lens 14 constituting the imaging lens of Embodiment 6 is formed by contacting a liquid type curable resin material to the second lens $L_2$ formed of a curable resin material, and solidifying, that is curing this curable resin material, so that the first lens $L_1$ or the third lens $L_3$ is bonded to the second lens $L_2$ (direct bonding). The second junction type compound lens 16 is formed by contacting a liquid type curable resin material to the fifth lens $L_5$ formed of a curable resin material, and solidifying, that is curing, this curable resin material, so that the fourth lens $L_4$ or the sixth lens $L_6$ is bonded to the fifth lens $L_5$ (direct bonding).

It is also possible that an optical-parallel plate is formed by a curable resin material, just like the case of the second lens $L_2$ formed of optical glass, and the first lens $L_1$ or the third lens $L_3$, formed of a curable resin material, and this second lens $L_2$, which is the optical-parallel plate, are indirectly bonded. Also it is possible that an optical-parallel plate is formed of a curable resin material, just like the case of the fifth lens $L_5$ formed of optical glass, and the fourth lens $L_4$ or the sixth lens $L_6$, formed of a curable resin material, and this fifth lens $L_5$, which is an optical-parallel plate, are indirectly bonded.

As the descriptions on the imaging lenses according to Embodiment 1 to Embodiment 6 show, the problem to be solved by this invention is solved by designing each composing lens of the imaging lens so as to satisfy the above Expression (1) to (8). In other words, an imaging lens where various aberrations are well corrected, sufficient back focus is acquired, and optical length is maintained short, can be acquired.

As described above, the imaging lens of the present invention is suitable not only for a lens for a camera built into a portable telephone, personal computer or digital camera, but also for a lens for a camera built into a personal digital assistant (PDA), a lens for a camera built into a toy having an image recognition function, and a lens for a camera built into monitoring, inspection or crime prevention equipment.

The invention claimed is:

1. An imaging lens, comprising a first diaphragm, a first junction type compound lens, a second diaphragm, and a second junction type compound lens, characterized in that said first diaphragm, said first junction type compound lens, said second diaphragm and said second junction type compound lens are arranged in this sequence from an object side to an image side, said first junction type compound lens comprises a first lens, a second lens and a third lens arranged in this sequence from the object side to the image side, said second junction type compound lens comprises a fourth lens, a fifth lens and a sixth lens arranged in this sequence from the object side to the image side, said first lens, said third lens, said fourth lens and said sixth lens are formed of a curable resin material, said second lens and said fifth lens are formed of a high softening temperature optical glass material, said first lens and said second lens are bonded with adhesive, said second lens and said third lens are bonded with adhesive, said fourth lens and said fifth lens are bonded with adhesive, and said fifth lens and said sixth lens are bonded with adhesive, and the following Conditions (1) to (8) are satisfied:

$$0 \leq |N_3 - N_2| \leq 0.1 \quad (1)$$

$$0 \leq |N_3 - N_4| \leq 0.1 \quad (2)$$

$$0 \leq |v_3 - v_2| \leq 30.0 \quad (3)$$

$$0 \leq |v_3 - v_4| \leq 30.0 \quad (4)$$

$$0 \leq |N_9 - N_8| \leq 0.1 \quad (5)$$

$$0 \leq |N_9 - N_{10}| \leq 0.1 \quad (6)$$

$$0 \leq |v_9 - v_8| \leq 30.0 \quad (7)$$

$$0 \leq |v_9 - v_{10}| \leq 30.0 \quad (8)$$

where
$N_2$: refractive index of said first lens
$N_3$: refractive index of said second lens
$N_4$: refractive index of said third lens
$v_2$: Abbe number of said first lens
$v_3$: Abbe number of said second lens
$v_4$: Abbe number of said third lens
$N_8$: refractive index of said fourth lens
$N_9$: refractive index of said fifth lens
$N_{10}$: refractive index of said sixth lens
$v_8$: Abbe number of said fourth lens
$v_9$: Abbe number of said fifth lens
$v_{10}$: Abbe number of said sixth lens.

2. An imaging lens, comprising a first diaphragm, a first junction type compound lens, a second diaphragm and a second junction type compound lens, characterized in that said first diaphragm, said first junction type compound lens, said second diaphragm and said second junction type compound lens are arranged in this sequence from an object side to an image side, said first junction type compound lens comprises a first lens, a second lens and a third lens arranged in this sequence from the object side to the image side, said second junction type compound lens comprises a fourth lens, a fifth lens and a sixth lens arranged in this sequence from the object side to the image side, said first lens, said second lens, said third lens, said fourth lens, said fifth lens and said sixth lens are formed of a curable resin material, said first lens and said second lens are directly bonded, said second lens and said third lens are directly bonded, said fourth lens and said fifth lens are directly bonded, and said fifth lens and said sixth lens are directly bonded, and the following Conditions (1) to (8) are satisfied:

$$0 \leq |N_3 - N_2| \leq 0.1 \quad (1)$$

$$0 \leq |N_3 - N_4| \leq 0.1 \quad (2)$$

$$0 \leq |v_3 - v_2| \leq 30.0 \quad (3)$$

$$0 \leq |v_3 - v_4| \leq 30.0 \quad (4)$$

$$0 \leq |N_9 - N_8| \leq 0.1 \quad (5)$$

$$0 \leq |N_9 - N_{10}| \leq 0.1 \quad (6)$$

$$0 \leq |v_9 - v_8| \leq 30.0 \quad (7)$$

$$0 \leq |v_9 - v_{10}| \leq 30.0 \quad (8)$$

where
$N_2$: refractive index of said first lens
$N_3$: refractive index of said second lens
$N_4$: refractive index of said third lens
$v_2$: Abbe number of said first lens
$v_3$: Abbe number of said second lens
$v_4$: Abbe number of said third lens
$N_8$: refractive index of said fourth lens
$N_9$: refractive index of said fifth lens
$N_{10}$: refractive index of said sixth lens
$v_8$: Abbe number of said fourth lens v₉: Abbe number of said fifth lens
v₁₀: Abbe number of said sixth lens.

3. An imaging lens, comprising a first diaphragm, a first junction type compound lens, a second diaphragm and a second junction type compound lens, characterized in that
said first diaphragm, said first junction type compound lens, said second diaphragm and said second junction type compound lens are arranged in this sequence from an object side to an image side,
said first junction type compound lens comprises a first lens, a second lens and a third lens arranged in this sequence from the object side to the image side,
said second junction type compound lens comprises a fourth lens, a fifth lens and a sixth lens arranged in this sequence from the object side to the image side,
said first lens, said second lens, said third lens, said fourth lens, said fifth lens and said sixth lens are formed of a curable resin material,
said first lens and said second lens are bonded with adhesive, said second lens and said third lens are bonded with adhesive, said fourth lens and said fifth lens are bonded with adhesive, and said fifth lens and said sixth lens are bonded with adhesive, and
the following Conditions (1) to (8) are satisfied:

$$0 \leq |N_3 - N_2| \leq 0.1 \quad (1)$$

$$0 \leq |N_3 - N_4| \leq 0.1 \quad (2)$$

$$0 \leq |v_3 - v_2| \leq 30.0 \quad (3)$$

$$0 \leq |v_3 - v_4| \leq 30.0 \quad (4)$$

$$0 \leq |N_9 - N_8| \leq 0.1 \quad (5)$$

$$0 \leq |N_9 - N_{10}| \leq 0.1 \quad (6)$$

$$0 \leq |v_9 - v_8| \leq 30.0 \quad (7)$$

$$0 \leq |v_9 - v_{10}| \leq 30.0 \quad (8)$$

where
$N_2$: refractive index of said first lens
$N_3$: refractive index of said second lens
$N_4$: refractive index of said third lens
$v_2$: Abbe number of said first lens
$v_3$: Abbe number of said second lens
$v_4$: Abbe number of said third lens
$N_8$: refractive index of said fourth lens
$N_9$: refractive index of said fifth lens
$N_{10}$ refractive index of said sixth lens
$v_8$: Abbe number of said fourth lens
$v_9$: Abbe number of said fifth lens
$v_{10}$: Abbe number of said sixth lens.

4. The imaging lens according to claim 1, characterized in that
said second lens is an optical-parallel plate,
said first lens is a plano-convex lens where the object side face of said first lens is a convex surface facing the object side on a paraxial line,
said third lens is a plano-concave lens where the image side face of said third lens is a concave surface facing the image side on a paraxial line,
said fifth lens is an optical-parallel plate,
said fourth lens is a plano-convex lens where the object side face of said fourth lens is a convex surface facing the object side on a paraxial line, and
said sixth lens is a plano-concave lens where the image side face of said sixth lens is a concave surface facing the image side on a paraxial line.

5. The imaging lens according to claim 2, characterized in that
said second lens is an optical-parallel plate,
said first lens is a plano-convex lens where the object side face of said first lens is a convex surface facing the object side on a paraxial line,
said third lens is a plano-concave lens where the image side face of said third lens is a concave surface facing the image side on a paraxial line,
said fifth lens is an optical-parallel plate,
said fourth lens is a plano-convex lens where the object side face of said fourth lens is a convex surface facing the object side on a paraxial line, and
said sixth lens is a plano-concave lens where the image side face of said sixth lens is a concave surface facing the object side.

6. The imaging lens according to claim 3, characterized in that
said second lens is an optical-parallel plate,
said first lens is a plano-convex lens where the object side face of said first lens is a convex surface facing the object side on a paraxial line,
said third lens is a plano-concave lens where the image side face of said third lens is a concave surface facing the image side on a paraxial line,
said fifth lens is an optical-parallel plate,
said fourth lens is a plano-convex lens where the object side face of said fourth lens is a convex surface facing the object side on a paraxial line, and
said sixth lens is a plano-concave lens where the image side face of said sixth lens is a concave surface facing the image side on a paraxial line.

7. The imaging lens according to claim 1, characterized in that
said second lens is a biconvex lens,
said first lens is a lens where the object side face of said first lens is a convex surface facing the object side on a paraxial line,
said third lens is a lens where the image side face of said third lens is a concave surface facing the image side on a paraxial line,
said fifth lens is a biconcave lens,
said fourth lens is a lens where the object side face of said fourth lens is a convex surface facing the object side on a paraxial line, and
said sixth lens is a lens where the image side face of said sixth lens is a concave surface facing the image side on a paraxial line.

8. The imaging lens according to claim 1, characterized in that
said second lens is a meniscus lens of which convex surface faces the object side,
said first lens is a lens where the object side face of said first lens is a convex surface facing the object side on a paraxial line,
said third lens is a lens where the image side face of said third lens is a concave surface facing the image side on a paraxial line,
said fifth lens is a meniscus lens of which convex surface faces the image side,
said fourth lens is a lens where the object side face of said fourth lens is a convex surface facing the object side on a paraxial line, and said sixth lens is a lens where the image side face of said sixth lens is a concave surface facing the image side on a paraxial line.

9. The imaging lens according to claim 1, characterized in that
said second lens is a biconcave lens,
said first lens is a lens where the object side face of said first lens is a convex surface facing the object side on a paraxial line,
said third lens is a lens where the image side face of said third lens is a concave surface facing the image side on a paraxial line,
said fifth lens is a biconvex lens,
said fourth lens is a lens where the object side face of said fourth lens is a convex surface facing the object side on a paraxial line, and
said sixth lens is a lens where the image side face of said sixth lens is a concave surface facing the image side on a paraxial line.

10. The imaging lens according to claim 1, characterized in that
the object side face of said first lens and the image side face of said third lens are aspherical, and
the object side face of said fourth lens and the image side face of said sixth lens are aspherical.

11. The imaging lens according to claim 2, characterized in that
the object side face of said first lens and the image side face of said third lens are aspherical, and
the object side face of said fourth lens and the image side face of said sixth lens are aspherical.

12. The imaging lens according to claim 3, characterized in that
the object side face of said first lens and the image side face of said third lens are aspherical, and
the object side face of said fourth lens and the image side face of said sixth lens are aspherical.

13. The imaging lens according to claim 1, characterized in that
at least one surface out of both surfaces of said second lens and both surfaces of said fifth lens, a total of four surfaces, is coating-processed.

14. The imaging lens according to claim 3, characterized in that
at least one surface out of both surfaces of said second lens and both surfaces of said fifth lens, a total of four surfaces, is coating-processed.

15. The imaging lens according to claim 1, characterized in that said curable resin material is a transparent curable silicone resin.

16. The imaging lens according to claim 2, characterized in that said curable resin material is a transparent curable silicone resin.

17. The imaging lens according to claim 3, characterized in that said curable resin material is a transparent curable silicone resin.

\* \* \* \* \*